United States Patent
Matsuno

(10) Patent No.: US 7,188,244 B2
(45) Date of Patent: Mar. 6, 2007

(54) INFORMATION-PROCESSING APPARATUS, INFORMATION-PROCESSING METHOD, INFORMATION-PROCESSING SYSTEM, RECORDING MEDIUM AND PROGRAM

(75) Inventor: Katsumi Matsuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 935 days.

(21) Appl. No.: 10/174,094

(22) Filed: Jun. 17, 2002

(65) Prior Publication Data

US 2003/0005085 A1    Jan. 2, 2003

(30) Foreign Application Priority Data

Jun. 18, 2001 (JP) ............................. 2001-183315

(51) Int. Cl.
*H04L 9/12* (2006.01)
(52) U.S. Cl. ........................................ 713/169; 380/270
(58) Field of Classification Search ................ 713/168, 713/169; 380/270
See application file for complete search history.

(56) References Cited

U.S. PATENT DOCUMENTS 5,875,394 A * 2/1999 Daly et al. .................. 455/411
6,301,643 B1 * 10/2001 Crockett et al. ............ 711/162
6,377,792 B1 * 4/2002 Brown et al. ............... 455/411
6,535,855 B1 * 3/2003 Cahill et al. .................... 705/1
6,834,111 B1 * 12/2004 Nishimura et al. ......... 380/255

* cited by examiner

*Primary Examiner*—Matthew Smithers
(74) *Attorney, Agent, or Firm*—Frommer Lawrence & Haug LLP; William S. Frommer

(57) ABSTRACT

In order to drive a PC and a cam-coder communicating with each other by adopting a Bluetooth technique to carry out mutual authentication processing, the user presses an authentication button of the PC and an authentication button of the cam-coder simultaneously. An authentication program of the PC detects an on time to turn on the authentication button of the PC and an off time to turn off the button. Likewise, an authentication program of the cam-coder detects an on time to turn on the authentication button of the cam-coder and an off time to turn off the button. The detected on and off times are exchanged between the PC and the cam-coder. If a difference between the on times and a difference between the off times are each found to be within a predetermined range, a result of the mutual authentication processing is considered to be positive. In this way, the mutual authentication processing can be carried out with ease.

45 Claims, 12 Drawing Sheets

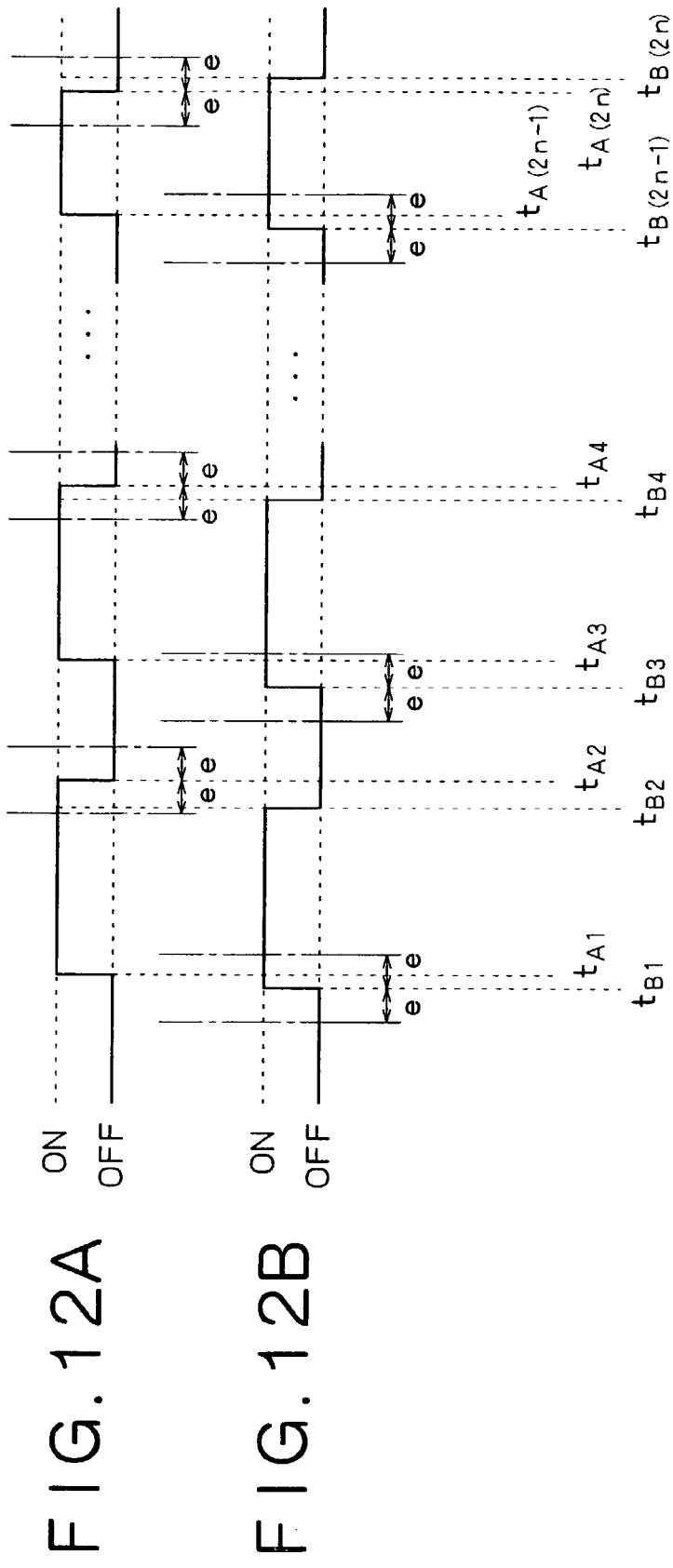

INFORMATION-PROCESSING APPARATUS, INFORMATION-PROCESSING METHOD, INFORMATION-PROCESSING SYSTEM, RECORDING MEDIUM AND PROGRAM

BACKGROUND OF THE INVENTION

The present invention relates to an information-processing apparatus, an information-processing method, an information-processing system, a recording medium and a program. More particularly, the present invention relates to an information-processing apparatus, an information-processing method, an information-processing system, a recording medium and a program that make mutual authentication among electronic apparatuses easy to carry out.

A short-distance wireless communication technology using Bluetooth for implementing communication among electronic apparatuses has been becoming more popular.

Bluetooth is a wireless communication technology using a 2.45 GHz-frequency band. Distances covered by Bluetooth are up to about 10 m. As a similar communication method, infrared-ray communication exists. However, Bluetooth can be used to communicate through an obstruction since it is wireless communication. From this point of view, Bluetooth offers a merit that the infrared-ray communication does not have.

Examples of the Bluetooth wireless communication are shown in FIGS. 1A through 1D. The Bluetooth wireless communication allows information to be exchanged between a PC (Personal Computer) 1 and a cam-coder 2 as shown in FIG. 1A, between a portable phone 3 and a handy cam-coder 4 as shown in FIG. 1B, between the cam-coder 2 and a portable information communication terminal 5 as shown in FIG. 1C and between a portable personal computer 6 and the portable information communication terminal 5 as shown in FIG. 1D.

Through the Bluetooth wireless connection requiring specially no wires, it is possible to transfer data from the portable information communication terminal 5 to the portable personal computer 6 located at a different room. It is also possible to connect the portable phone 3 placed in a pocket of a user's clothes to the handy cam-coder 4 and transmit an image recorded in the handy cam-coder 4 to another electronic apparatus by way of the Internet.

In order to avoid communication malfunctions, incorrect connections or data leakages in data transfers during communications between such electronic apparatuses, each of the apparatuses carries out mutual authentication processing in a first communication. At that time, the user enters a password such as a string of alphanumeric characters to each of the electronic apparatuses if necessary to let the apparatus carry out authentication processing.

By referring to a flowchart shown in FIG. 2, the following description explains authentication processing carried out initially in a communication shown in FIG. 1A between the personal computer 1 and the cam-coder 2.

As shown in FIG. 2, the flowchart begins with a step S1 at which the personal computer 1 determines whether or not a password for identifying a user has been entered by an input unit such as a keyboard. The personal computer 1 is also referred to hereafter as the PC 1. In Bluetooth specifications, a password for identifying a user is called a PIN (Personal Identification Number). If a password for identifying a user has not been entered, the determination is made repeatedly till such a password is entered. If a password for identifying a user is judged entered, the flow of the processing goes on to a step S2.

By the same token, the cam-coder 2 carries out similar processing at a step S21.

At the next step S2, the PC 1 generates a random number R0 and transmits it to the cam-coder 2. Subsequently, at the next step S3, the PC 1 computes a common key E22 (R0, PIN, BDADDR-Cam) from the random number R0, the PIN and a BDADDR-Cam (Blue-tooth Device Address for Camcoder) by using a predetermined function E22. The BDADDR-Cam is a unique number assigned to the cam-coder 2 for identifying the cam-coder 2. The BDADDR-Cam is selected as a number for identifying an electronic apparatus specified by the user as an apparatus to be connected to the PC 1. In this case, the electronic apparatus is the cam-coder 2.

At a step S22, the cam-coder 2 computes a common key CK (=E22 (R0, PIN, BDADDR-Cam)) from the random number R0, the PIN and the BDADDR-Cam by applying the same function E22 used by the PC 1 at the step S3. The cam-coder 2 then transmits the common key CK to the PC 1 as a response to the PC 1.

At a step S4, the PC 1 generates a random number R1 for authentication and transmits it to the cam-coder 2. Then, at the next step S5, the PC 1 computes a password A (=E1(R1, CK, BDADDR-Cam)) from the random number R1, the common key CK and the BDADDR-Cam by using a function E1.

At that time, at a step S23, the cam-coder 2 computes a password A' (=E1 (R1, CK, BDADDR-Cam)) from the random number R1 transmitted from the PC 1, the common key and the BDADDR-Cam by applying the same function E1 used by the PC 1 at the step S4. The cam-coder 2 then transmits the password A' to the PC 1.

At a step S6, the PC 1 determines whether or not the password A computed by itself matches the password A' received from the cam-coder 2. If the result of the determination indicates that the password A matches the password A', the flow of the processing goes on to a step S7 at which the PC 1 notifies the cam-coder 2 that the passwords match each other.

At a step S24, the cam-coder 2 receives a notice from the PC 1. At the next step S25, the cam-coder 2 examines the notice to determine whether or not the notice indicates that the password A matches the password A'. As described above, at the step S7, the PC 1 notified the cam-coder 2 that the passwords match each other. In this case, the flow of the processing goes on to a step S26 at which the cam-coder 2 generates a random number R2 for authentication and transmits the random number R2 to the PC 1. Then, at the next step S27, the cam-coder 2 computes a password B (=E1 (R2, CK, BDADDR-PC)) from the random number R2, the common key CK and a BDADDR-PC.

At a step S8, on the other hand, the PC 1 computes a password B' (=E1(R2, CK, BDADDR-PC)) from the random number R2 transmitted from the cam-coder 2, the common key CK and a BDADDR-PC by using the function E1 Then, the PC 1 transmits the password B' to the cam-coder 2.

At a step S28, the cam-coder 2 determines whether or not the password B matches the password B'. If the outcome of the determination indicates that the password B matches the password B', the flow of the processing goes on to a step S29 at which a positive result of authentication is recognized and, at the same time, the PC 1 is notified that the password B matches the password B'. At a step S9, the PC 1 receives the notice, recognizing the positive result of authentication verifying that the password B matches the password B'.

If the outcome of the determination made at the step S6 indicates that the password A does not match the password A', on the other hand, the flow of the processing goes on to a step S10 at which the PC 1 notifies the cam-coder 2 that the password A does not match the password A' and then ends the processing.

In this case, at the step S24, the cam-coder 2 receives the notice indicating that the password A does not match the password A'. Thus, the outcome of the determination made at the next step S25 indicates that the password A does not match the password A'. In this case, the cam-coder 2 ends the processing.

If the outcome of the determination made at the step S28 indicates that the password B does not match the password B', on the other hand, the flow of the processing goes on to a step S30 at which the cam-coder 2 determines that the result of authentication was negative. In this case, the cam-coder 2 notifies the PC 1 that the password B does not match the password B'.

Then, at the second and subsequent connections, the electronic apparatuses which are to be communicated with each other carry out automatic authentication by using the passwords A and B stored during the first authentication processing as well as the common key CK generated at the first connection so that the processing carried out by the users to enter passwords can be eliminated.

In the configuration described above, however, there occurs only a slight problem when the PC 1 is connected to a fixed communication partner such as the cam-coder 2 or a wireless access point in a LAN (Local Area Network). In a case where the communication partner is changed, on the other hand, there is raised a problem that it is necessary to enter a password each time the PC 1 is connected with another electronic apparatus serving as a new communication partner. As a result, the processing becomes cumbersome. An example of the case where the communication partner is changed is a case in which application software or the like executed on the PC 1 temporarily exchanges information such as picture data with another electronic apparatus and, with a next timing, must change the communication partner.

SUMMARY OF THE INVENTION

It is thus an object of the present invention addressing the problem described above to allow a first mutual authentication to be implemented by carrying out simple processing in execution of the Bluetooth wireless communication.

According to the first aspect of the present invention, there is provided an information-processing apparatus connected to another information-processing apparatus via a network, the information-processing apparatus including:

input means for inputting on and off commands;

first timing recognition means for recognizing a first timing with which an on command is input by the input means;

second timing recognition means for recognizing a second timing with which an off command is input by the input means; and transmission means for transmitting the first and second timings to the other information-processing apparatus via the network.

According to the second aspect of the present invention, there is provided an information-processing method adopted by an information-processing apparatus connected to another information-processing apparatus via a network, the information-processing method including:

an input step for inputting on and off commands;

a first timing recognition step for recognizing a first timing with which an on command is input in the input step;

a second timing recognition step for recognizing a second timing with which an off command is input in the input step; and a transmission step for transmitting the first and second timings to the other information-processing apparatus via the network.

According to the third aspect of the present invention, there is provided a recording medium for storing a computer-readable program for controlling an information-processing apparatus connected to another information-processing apparatus via a network, the computer-readable program including:

an input control step for controlling input of on and off commands;

a first timing recognition control step for controlling recognition of recognizing a first timing with which an on command is input in the input control step;

a second timing recognition control step or controlling recognition of recognizing a second timing with which an off command is input in the input control step; and a transmission control step for controlling transmission of the first and second timings to the another information-processing apparatus via the network.

According to the fourth aspect of the present invention, there is provided a program for driving a computer for controlling an information-processing apparatus connected to another information-processing apparatus via a network, the program including:

an input control step for controlling input of on and off commands;

a first timing recognition control step for controlling recognition of recognizing a first timing with which an on command is input in the input control step;

a second timing recognition control step for controlling recognition of recognizing a second timing with which an off command is input in the input control step; and a transmission control step for controlling transmission of the first and second timings to the other information-processing apparatus via the network.

According to the fifth aspect of the present invention, there is provided an information-processing apparatus connected to another information-processing apparatus via a network, the information-processing apparatus including:

input means for inputting on and off commands;

first timing recognition means for recognizing a first timing with which an on command is input by the input means;

second timing recognition means for recognizing a second timing with which an off command is input by the input means;

reception means for receiving a third timing and a fourth timing from the other information-processing apparatus where the third timing is a timing by which an input means employed by the other information-processing apparatus inputs an on command and the fourth timing is a timing by which the input means employed by the other information-processing apparatus inputs an off command;

comparison means for comparing the first timing with the third timing and comparing the second timing with the fourth timing; and authentication means for executing authentication processing with respect to the other information-processing apparatus on the basis of a comparison result produced by the comparison means.

According to the sixth aspect of the present invention, there is provided an information-processing method adopted by an information-processing apparatus connected to another information-processing apparatus via a network, the information-processing method including:

an input step for inputting on and off commands;

a first timing recognition step for recognizing a first timing with which an on command is input in the input step;

a second timing recognition step for recognizing a second timing with which an off command is input in the input step;

a reception step for receiving a third timing and a fourth timing from the other information-processing apparatus where the third timing is a timing by which the other information-processing apparatus inputs an on command in an input step and the fourth timing is a timing by which the other information-processing apparatus inputs an off command in an input step;

a comparison step for comparing the first timing with the third timing and comparing the second timing with the fourth timing; and an authentication step for executing authentication processing with respect to the other information-processing apparatus on the basis of a comparison result produced in the comparison step.

According to the seventh aspect of the present invention, there is provided a recording medium for storing a computer-readable program for controlling an information-processing apparatus connected to another information-processing apparatus via a network, the computer-readable program including:

an input control step for controlling input of on and off commands;

a first timing recognition control step for controlling recognition of a first timing with which an on command is input in the input control step;

a second timing recognition control step for controlling recognition of a second timing with which an off command is input in the input control step;

a reception control step for controlling reception of a third timing and a fourth timing from the other information-processing apparatus where the third timing is a timing by which the other information-processing apparatus inputs an on command in an input control step and the fourth timing is a timing by which the other information-processing apparatus inputs an off command in an input control step;

a comparison control step or controlling comparison of the first timing with the third timing and comparing the second timing with the fourth timing; and an authentication control step for controlling execution of authentication processing with respect to the other information-processing apparatus on the basis of a comparison result produced in the comparison control step.

According to the eighth aspect of the present invention, there is provided a program for driving a computer for controlling an information-processing apparatus connected to another information-processing apparatus via a network, the program including:

an input control step for controlling input of on and off commands;

a first timing recognition control step for controlling recognition of a first timing with which an on command is input in the input control step;

a second timing recognition control step for controlling recognition of a second timing with which an off command is input in the input control step;

a reception control step for controlling reception of receiving a third timing and a fourth timing from the other information-processing apparatus where the third timing is a timing by which the other information-processing apparatus inputs an on command in an input control step and the fourth timing is a timing by which the other information-processing apparatus inputs an off command in an input control step;

a comparison control step for controlling comparison of the first timing with the third timing and comparing the second timing with the fourth timing; and an authentication control step for controlling execution of authentication processing with respect to the other information-processing apparatus on the basis of a comparison result produced in the comparison control step.

According to the ninth aspect of the present invention, there is provided an information-processing system including a first information-processing apparatus and a second information-processing apparatus connected to the first information-processing apparatus via a network, the first information-processing apparatus including:

first input means for inputting on and off commands;

first timing recognition means for recognizing a first timing with which an on command is input by the first input means;

second timing recognition means for recognizing a second timing with which an off command is input by the first input means; and transmission means for transmitting the first and second timings to the second information-processing apparatus via the network, the second information-processing apparatus including:

second input means for inputting on and off commands;

third timing recognition means for recognizing a third timing with which an on command is input by the second input means;

fourth timing recognition means for recognizing a fourth timing with which an off command is input by the second input means;

reception means for receiving the first and second timings from the first information-processing apparatus via the network;

comparison means for comparing the first timing with the third timing and comparing the second timing with the fourth timing; and authentication means for executing authentication processing with respect to the first information-processing apparatus on the basis of a comparison result produced by the comparison means.

According to the tenth aspect of the present invention, there is provided an information-processing method adopted by an information-processing system including a first information-processing apparatus and a second information-processing apparatus connected to the first information-processing apparatus via a network, the information-processing method for the first information-processing apparatus including:

a first input step for inputting on and off commands;

a first timing recognition step for recognizing a first timing with which an on command is input in the first input step;

a second timing recognition step for recognizing a second timing with which an off command is input in the first input step; and a transmission step for transmitting the first and second timings to the second information-processing apparatus via the network, the information-processing method for the second information-processing apparatus including:

a second input step for inputting on and off commands;

a third timing recognition step for recognizing a third timing with which an on command is input in the second input step;

a fourth timing recognition step for recognizing a fourth timing with which an off command is input in the second input step;

a reception step for receiving the first and second timings from the first information-processing apparatus via the network;

a comparison step for comparing the first timing with the third timing and comparing the second timing with the fourth timing; and an authentication step for executing authentication processing with respect to the first information-processing apparatus on the basis of a comparison result produced in the comparison step.

According to the eleventh aspect of the present invention, there is provided a recording medium for storing a computer-readable program for controlling an information-processing system including a first information-processing apparatus and a second information-processing apparatus connected to the first information-processing apparatus via a network, the computer-readable program for the first information-processing apparatus including:

a first input control step for controlling input of on and off commands;

a first timing recognition control step for controlling recognition of a first timing with which an on command is input in the first input control step;

a second timing recognition control step for controlling recognition of a second timing with which an off command is input in the first input control step; and a transmission control step for controlling transmission of the first and second timings to the second information-processing apparatus via the network, the computer-readable program for the second information-processing apparatus including:

a second input control step for controlling input of on and off commands;

a third timing recognition control step for controlling recognition of a third timing with which an on command is input in the second input control step;

a fourth timing recognition control step for controlling recognition of a fourth timing with which an off command is input in the second input control step;

a reception control step for controlling reception of the first and second timings from the first information-processing apparatus via the network;

a comparison control step for controlling comparison of the first timing with the third timing and comparing the second timing with the fourth timing; and an authentication control step for controlling execution of authentication processing with respect to the first information-processing apparatus on the basis of a comparison result produced in the comparison control step.

According to the twelfth aspect of the present invention, there is provided a program for driving computers for controlling an information-processing system including a first information-processing apparatus and a second information-processing apparatus connected to the first information-processing apparatus via a network, the program, which causes one of the computers for controlling the first information-processing apparatus to execute processing including:

a first input control step for controlling input of on and off commands;

a first timing recognition control step for controlling recognition of a first timing with which an on command is input in the first input control step;

a second timing recognition control step for controlling recognition of a second timing with which an off command is input in the first input control step; and a transmission control step for controlling transmission of the first and second timings to the second information-processing apparatus via the network, the program, which causes one of the other computers for controlling the second information-processing apparatus to execute processing including:

a second input control step for controlling input of on and off commands;

a third timing recognition control step for controlling recognition of a third timing with which an on command is input in the second input control step;

a fourth timing recognition control step for controlling recognition of a fourth timing with which an off command is input in the second input control step;

a reception control step for controlling reception of the first and second timings from the first information-processing apparatus via the network;

a comparison control step for controlling comparison of the first timing with the third timing and comparing the second timing with the fourth timing; and an authentication control step for controlling execution of authentication processing with respect to the first information-processing apparatus on the basis of a comparison result produced in the comparison control step.

According to the thirteenth aspect of the present invention, there is provided an information-processing apparatus connected to another information-processing apparatus via a network, the information-processing apparatus including:

input means for inputting on and off commands;

first timing recognition means for recognizing a first timing with which an on command is input by the input means;

second timing recognition means for recognizing a second timing with which an off command is input by the input means;

transmission means for transmitting the first or second timing to the other information-processing apparatus via the network;

reception means for receiving a third timing corresponding to the first timing or a fourth timing corresponding to the second timing from the other information-processing apparatus where the third timing is a timing by which an input means employed by the other information-processing apparatus inputs an on command and the fourth timing is a timing by which the input means employed by the other information-processing apparatus inputs an off command;

comparison means for comparing the first timing with the third timing or comparing the second timing with the fourth timing; and authentication means for executing authentication processing with respect to the other information-processing apparatus on the basis of a comparison result produced by the comparison means.

According to the fourteenth aspect of the present invention, there is provided an information-processing method adopted by an information-processing apparatus connected to another information-processing apparatus via a network, the information-processing method including:

an input step for inputting on and off commands;

a first timing recognition step for recognizing a first timing with which an on command is input in the input step;

a second timing recognition step for recognizing a second timing with which an off command is input in the input step;

a transmission step for transmitting the first or second timing to the other information-processing apparatus via the network;

a reception step for receiving a third timing corresponding to the first timing or a fourth timing corresponding to the second timing from the other information-processing apparatus where the third timing is a timing by which the other information-processing apparatus inputs an on command in an input step and the fourth timing is a timing by which the other information-processing apparatus inputs an off command in an input step;

a comparison step for comparing the first timing with the third timing or comparing the second timing with the fourth timing; and an authentication step for executing authentication processing with respect to the other information-processing apparatus on the basis of a comparison result produced in the comparison step.

According to the fifteenth aspect of the present invention, there is provided a recording medium for storing a computer-readable program for controlling an information-processing apparatus connected to another information-processing apparatus via a network, the computer-readable program including:

an input control step for controlling input of on and off commands;

a first timing recognition control step for controlling recognition of a first timing with which an on command is input in the input control step;

a second timing recognition control step for controlling recognition of a second timing with which an off command is input in the input control step;

a transmission control step for controlling transmission of the first or second timing to the other information-processing apparatus via the network;

a reception control step for controlling reception of a third timing corresponding to the first timing or a fourth timing corresponding to the second timing from the other information-processing apparatus where the third timing is a timing by which the other information-processing apparatus inputs an on command in an input control step and the fourth timing is a timing by which the other information-processing apparatus inputs an off command in an input control step;

a comparison control step for controlling comparison of the first timing with the third timing or comparing the second timing with the fourth timing; and an authentication control step for controlling execution of authentication processing with respect to the other information-processing apparatus on the basis of a comparison result produced in the comparison control step.

According to the sixteenth aspect of the present invention, there is provided a program for driving a computer for controlling an information-processing apparatus connected to another information-processing apparatus via a network, the program including:

an input control step for controlling input of on and off commands;

a first timing recognition control step for controlling recognition of a first timing with which an on command is input in the input control step;

a second timing recognition control step for controlling recognition of a second timing with which an off command is input in the input control step;

a transmission control step for controlling transmission of the first or second timing to the other information-processing apparatus via the network;

a reception control step for controlling reception of a third timing corresponding to the first timing or a fourth timing corresponding to the second timing from the other information-processing apparatus where the third timing is a timing by which the other information-processing apparatus inputs an on command in an input control step and the fourth timing is a timing by which the other information-processing apparatus inputs an off command in an input control step;

a comparison control step for controlling comparison of the first timing with the third timing or comparing the second timing with the fourth timing; and an authentication control step for controlling execution of authentication processing with respect to the other information-processing apparatus on the basis of a comparison result produced in the comparison control step.

According to the seventeenth aspect of the present invention, there is provided an information-processing system including a first information-processing apparatus and a second information-processing apparatus connected to the first information-processing apparatus via a network, the first information-processing apparatus including:

first input means for inputting on and off commands;

first timing recognition means for recognizing a first timing with which an on command is input by the first input means;

second timing recognition means for recognizing a second timing with which an off command is input by the first input means; and first transmission means for transmitting the second timing to the second information-processing apparatus via the network, the second information-processing apparatus including:

second input means for inputting on and off commands;

third timing recognition means for recognizing a third timing with which an on command is input by the second input means;

fourth timing recognition means for recognizing a fourth timing with which an off command is input by the second input means; and second transmission means for transmitting the third timing to the first information-processing apparatus via the network, wherein the first information-processing apparatus includes:

first reception means for receiving the third timing from the second information-processing apparatus via the network;

first comparison means for comparing the first timing with the third timing; and first authentication means for executing authentication processing with respect to the second information-processing apparatus on the basis of a comparison result produced by the first comparison means, and wherein the second information-processing apparatus includes:

second reception means for receiving the second timing from the first information-processing apparatus via the network;

second comparison means for comparing the second timing with the fourth timing; and second authentication means for executing authentication processing with respect to the first information-processing apparatus on the basis of a comparison result produced by the second comparison means.

According to the eighteenth aspect of the present invention, there is provided an information-processing method adopted by an information-processing system including a first information-processing apparatus and a second information-processing apparatus connected to the first information-processing apparatus via a network, the information-processing method for the first information-processing apparatus including:

a first input step for inputting on and off commands;

a first timing recognition step for recognizing a first timing with which an on command is input in the first input step;

a second timing recognition step for recognizing a second timing with which an off command is input in the first input step; and a first transmission step for transmitting the second timing to the second information-processing apparatus via the network, the information-processing method for the second information-processing apparatus including:

a second input step for inputting on and off commands;

a third timing recognition step for recognizing a third timing with which an on command is input in the second input step;

a fourth timing recognition step for recognizing a fourth timing with which an off command is input in the second input step; and a second transmission step for transmitting the second timing from the first information-processing apparatus via the network;

wherein the information-processing method for the first information-processing apparatus includes:

a first reception step for receiving the third timing from the second information-processing apparatus via the network;

a first comparison step for comparing the first timing with the third timing; and a first authentication step for executing authentication processing with respect to the second information-processing apparatus on the basis of a comparison result produced in the first comparison control step, and wherein the information-processing method for the second information-processing apparatus includes:

a second reception step for receiving the second timing from the first information-processing apparatus via the network;

a second comparison step for comparing the second timing with the fourth timing; and a second authentication step for executing authentication processing with respect to the first information-processing apparatus on the basis of a comparison result produced in the second comparison step.

According to the nineteenth aspect of the present invention, there is provided a recording medium for storing a computer-readable program, which causes computers for controlling an information processing system to execute control processing, the information processing system including a first information processing apparatus and a second information apparatus connected to the first information processing apparatus via a network, the first information processing apparatus including:

first input means for inputting on and off commands;

first timing recognition means for recognizing a first timing with which an on command is input by the first input means;

second timing recognition means for recognizing a second timing with which an off command is input by the first input means; and first transmission means for transmitting the second timing to the second information processing apparatus via the network, the second information processing apparatus including:

second input means for inputting on and off commands;

third timing recognition means for recognizing a third timing with which an on command is input by the second input means;

fourth timing recognition means for recognizing a fourth timing with which an off command is input by the second input means; and second transmission means for transmitting the third timing to the first information processing apparatus via the network, wherein the program causes one of the computers for controlling the first information processing apparatus to execute:

a first reception control step for controlling reception of the third timing from the second information processing apparatus;

a first comparison control step for controlling comparison of the first timing with the third timing; and a first authentication control step for controlling execution of authentication processing with respect to the second information processing apparatus on the basis of a comparison result produced in the first comparison control step, and wherein the program causes the other of the computers for controlling the second information processing apparatus to execute:

a second reception control step for controlling reception of the second timing from the first information processing apparatus;

a second comparison control step for controlling comparison of the second timing with the fourth timing; and a second authentication control step for controlling execution of authentication processing with respect to the first information processing apparatus on the basis of a comparison result produced in the second comparison control step.

According to the twentieth aspect of the present invention, there is provided a program, which causes computers for controlling an information processing system to execute control processing, the information processing system including a first information processing apparatus and a second information apparatus connected to the first information processing apparatus via a network, the first information processing apparatus including:

first input means for inputting on and off commands;

first timing recognition means for recognizing a first timing with which an on command is input by the first input means;

second timing recognition means for recognizing a second timing with which an off command is input by the first input means; and first transmission means for transmitting the second timing to the second information processing apparatus via the network, the second information processing apparatus including:

second input means for inputting on and off commands;

third timing recognition means for recognizing a third timing with which an on command is input by the second input means;

fourth timing recognition means for recognizing a fourth timing with which an off command is input by the second input means; and second transmission means for transmitting the third timing to the first information processing apparatus via the network, wherein the program causes one of the computers for controlling the first information processing apparatus to execute:

a first reception control step for controlling reception of the third timing from the second information processing apparatus;

a first comparison control step for controlling comparison of the first timing with the third timing; and a first authentication control step for controlling execution of authentication processing with respect to the second information processing apparatus on the basis of a comparison result produced in the first comparison control step, and wherein the program causes the other of the computers for controlling the second information processing apparatus to execute:

a second reception control step for controlling reception of the second timing from the first information processing apparatus;

a second comparison control step for controlling comparison of the second timing with the fourth timing; and a second authentication control step for controlling execution of authentication processing with respect to the first information processing apparatus on the basis of a comparison result produced in the second comparison control step.

The above and other objects, features and advantages of the present invention will become apparent from the following description and the appended claims, taken in conjunction with the accompanying drawings in which like parts or elements denoted by like reference symbols.

BRIEF DESCRIPTION OF THE DIAGRAMS

FIGS. 12A and 12B are timing charts showing a timing with which an authentication button is pressed.

DETAILED DESCRIPTION OF THE PREFERRED EMBODIMENT

Figure 3:
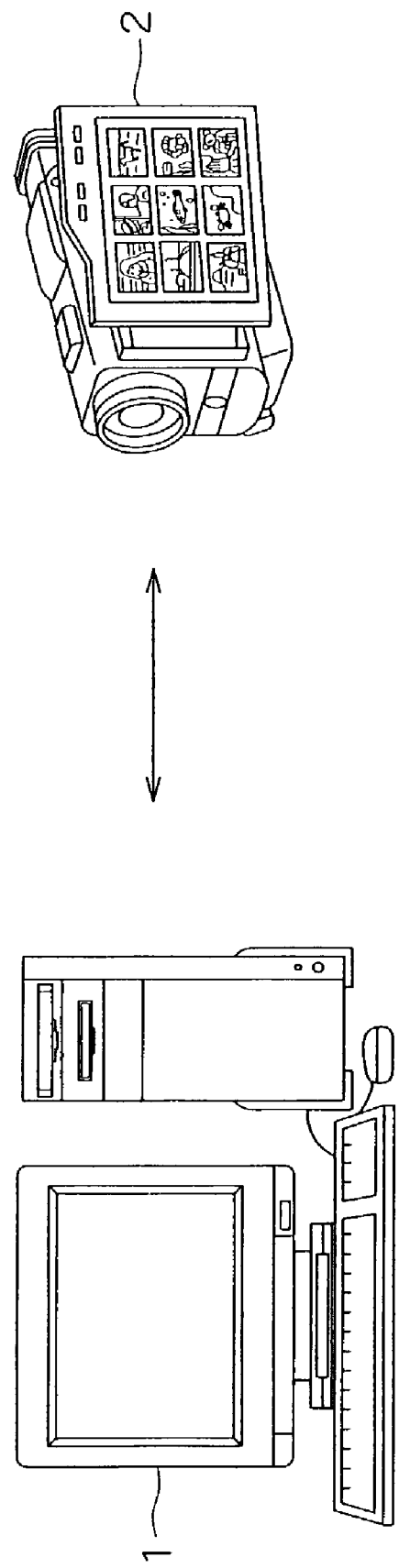
FIG. 3 is a schematic view showing the configuration of an embodiment implementing a wireless communication system to which the present invention is applied.

FIG. 3 is a schematic view showing the configuration of an embodiment implementing a wireless communication system to which the present invention is applied. It should be noted that, in descriptions referring to FIG. 3 and subsequent figures, components corresponding to those employed in the conventional system are denoted by the same reference numerals as the conventional system and their explanation is omitted appropriately.

By using the Bluetooth technique described above, the personal computer 1 and the cam-coder 2 are capable of exchanging data with each other through wireless communication.

Figure 4:
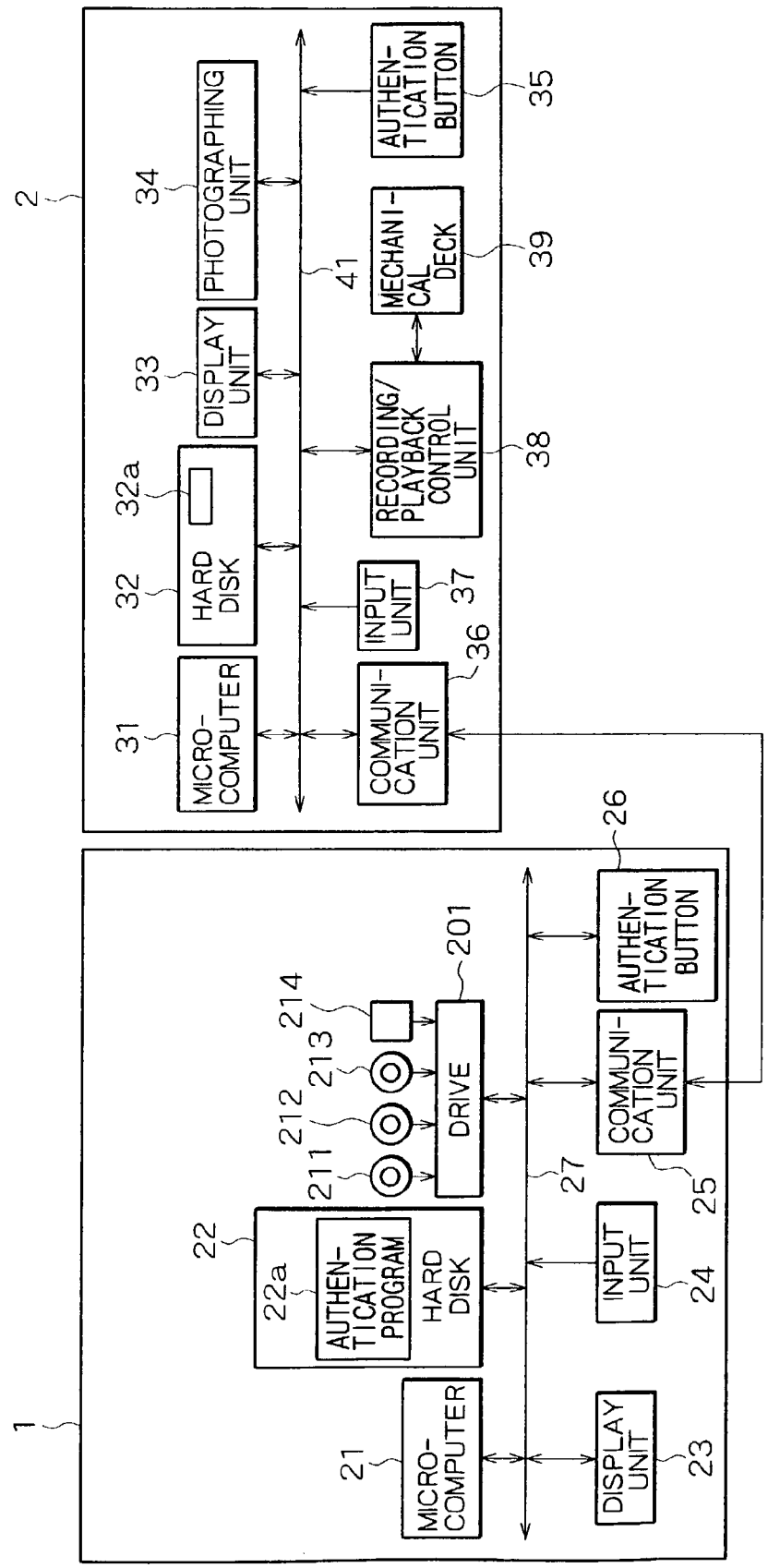
FIG. 4 is a block diagram showing the configurations of a personal computer and a cam-coder, which are shown in FIG. 3.

FIG. 4 is a block diagram showing the configurations of the personal computer 1 and the cam-coder 2, to which the present invention is applied.

First of all, the configuration of the personal computer 1 is explained. A microcomputer 21 employed in the personal computer 1 includes a CPU (Central Processing Unit), a ROM (Read-Only Memory) and a RAM (Random-Access Memory). The CPU properly loads programs from the ROM to the RAM, and executes the programs to carry out various kinds of processing. The microcomputer 21 controls the entire operation of the personal computer 1. The microcomputer 21 also loads a variety of programs, mainly an authentication program 22a, from a hard disk 22 to the internal RAM through a bus 27 in order to carry out various kinds of processing. In addition, the microcomputer 21 loads a variety of programs from a magnetic disk 211, an optical disk 212, a magnetic optical disk 213 or a semiconductor memory 214 to the internal RAM through the bus 27 in order to carry out various kinds of processing. If necessary, the microcomputer 21 also writes variety of programs or data to the magnetic disk 211, the optical disk 212, the magnetic optical disk 213 or the semiconductor memory 214. The magnetic disk 211, the optical disk 212, the magnetic optical disk 213 or the semiconductor memory 214 is mounted on a drive 201.

The hard disk 22 is used for storing a variety of programs and data required in execution of the programs. A representative of the programs is the authentication program 22a executed to carry out authentication processing with respect to another electronic apparatus such as the cam-coder 2, which is connected via a communication unit 25. Controlled by the microcomputer 21, a display unit 23 is implemented by a CRT (Cathode Ray Tube), an LCD (Liquid Crystal Display) or the like. The display unit 23 displays a variety of processing results and operation windows to be described later. The authentication program 22a detects a timing with which an authentication button 26 is pressed. The authentication program 22a also detects a timing with which an operation to press the authentication button 26 is completed. The detected timings are compared with similar timings received from the cam-coder 2 by considering a difference in reference time between the PC 1 and the cam-coder 2. Authentication processing is then carried out in dependence on a result of comparison. The reference time of the PC 1 is generated from a real-time-clock signal not shown in the figure.

An input unit 24 includes a keyboard and a mouse, which are operated by the user for entering a variety of commands. The communication unit 25 has the so-called Bluetooth configuration for exchanging various kinds of data with another electronic apparatus such as mainly the cam-coder 2 through wireless communications on the basis of a command issued by the microcomputer 21.

The authentication button 26 is operated at the same time as an authentication button 35 provided on the cam-coder 2 to be authenticated in first authentication processing prescribed in the Bluetooth standard. That is to say, if the authentication buttons 26 and 35 are turned on or off with the same timing, the authentication processing carried out accordingly produces a positive result. The operations of the authentication buttons 26 and 35 will be described later in detail.

Next, the configuration of the cam-coder 2 is explained. A microcomputer 31 employed in the cam-coder 2 controls the entire operation of the cam-coder 2. The microcomputer 31 includes a CPU, a ROM and a RAM. The CPU employed in the microcomputer 31 properly loads programs from the ROM to the RAM and executes the programs to carry out various kinds of processing. The microcomputer 31 also loads a variety of programs, mainly an authentication program 32a, from a hard disk 32 connected to a bus 41 to the internal RAM in order to carry out various kinds of processing.

The authentication program 32a detects a timing with which the authentication button 35 is pressed. The authentication program 32a also detects a timing with which an operation to press the authentication button 35 is completed. The detected timings are compared with similar timings received from the PC 1 by considering a difference in reference time between the PC 1 and the cam-coder 2. Authentication processing is then carried out in dependence on a result of comparison The reference time of the cam-coder 2 is generated from a real-time-clock signal not shown in the figure.

A display unit 33 displays a picture taken by a photographing unit 34 or a picture recorded in a recording medium mounted on a mechanical deck 39. The photographing unit 34 is a CCD (Charge Coupled Device) camera or the like for photographing an object not shown in the figure and for reproducing picture data.

A communication unit 36 also has Bluetooth configuration as the one described above. Controlled by the microcomputer 31, the communication unit 36 exchanges various kinds of data with the PC 1 by wireless communications.

An input unit 37 includes tablet buttons operated by the user to enter a variety of commands.

A recording/playback control unit 38 compresses video and audio data obtained by the photographing unit 34 in accordance with a predetermined compression technique on the basis of a command issued by the microcomputer 31, and records the compressed data onto a recording medium mounted on the mechanical deck 39. The recording/playback control unit 38 also decompresses video and audio data read out from the recording medium, plays back the original video and audio data and displays the data on the display unit 33.

The following description explains authentication operations, which are carried out when the authentication button 26 employed on the PC 1 and the authentication button 35 employed on the cam-coder 2 are operated. In order to have the PC 1 authenticate the cam-coder 2 and vice versa, the user presses the authentication buttons 26 and 35 with the same timing.

The authentication program 22a detects a timing with which the authentication button 26 is pressed. The authentication program 22a also detects a timing with which an operation to press the authentication button 26 is completed. The detected timings are transmitted to the cam-coder 2 in a wireless communication and compared with timings received from the cam-coder 2.

By the same token, the authentication program 32a detects a timing with which the authentication button 35 is pressed. The authentication program 32a also detects a timing with which an operation to press the authentication button 35 is completed. The detected timings are transmitted to the PC 1 in a wireless communication and compared with timings received from the PC 1.

If results of the comparisons indicate that the timings match each other, the authentication is determined to give a positive result. That is to say, if the electronic apparatus are not partners to be authenticated, it is out of the bounds of possibility that the authentication buttons 26 and 35 are pressed with the same timing. If the authentication buttons 26 and 35 are pressed with the same timing, on the other hand, authentication processing carried out in both the electronic apparatuses will indicate that the result of the authentication is positive.

Since the authentication buttons 26 and 35 are both operated by the user, that is, operated manually by a human being, however, they may probably be pressed not with strictly the same timing even though the user intends to operate the authentication buttons 26 and 35 with the same timing. Thus, a time margin is taken into consideration when timings are compared.

Figure 5:
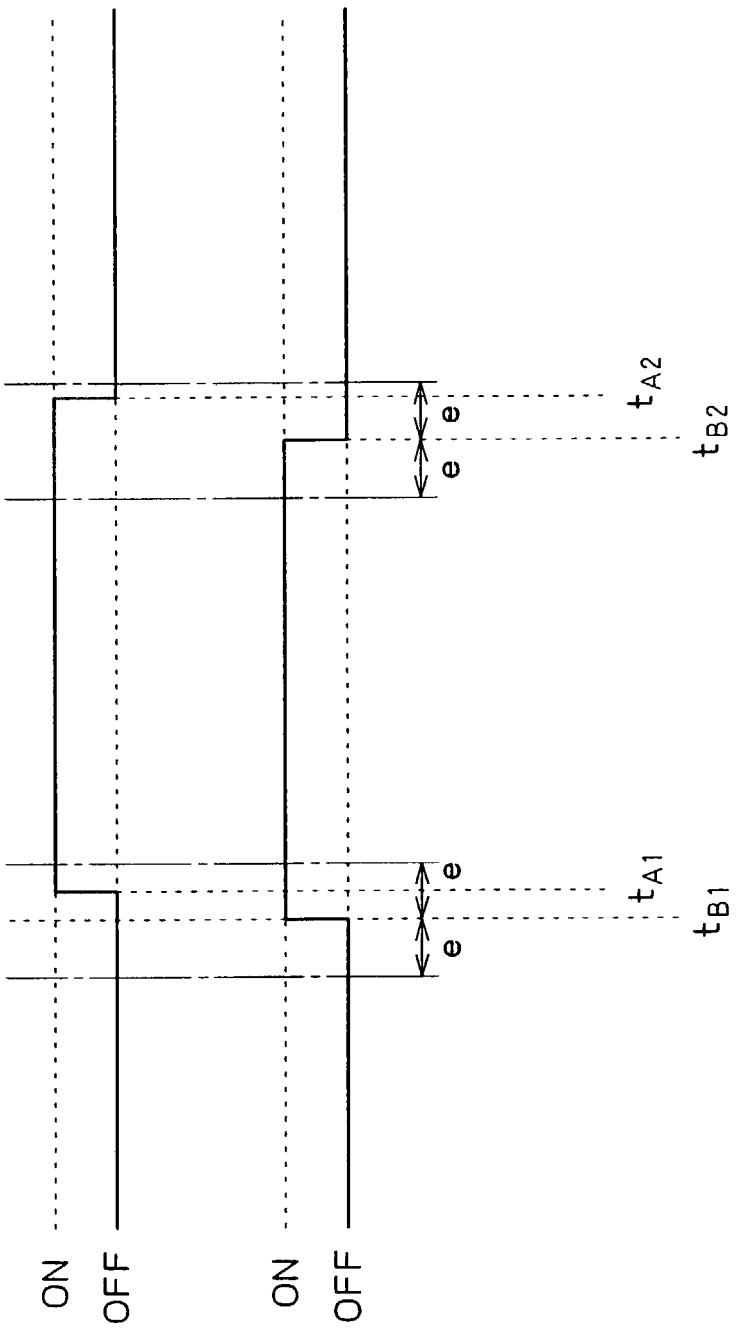
FIGS. 5A and 5B are timing charts showing a timing with which an authentication button is pressed.

To put it in detail, assume that the authentication button 26 employed in the PC 1 is pressed with a timing tA1 and the operation to press the authentication button 26 is completed with a timing tA2 as shown in FIG. 5A. By the same token, assume that the authentication button 35 employed in the cam-coder 2 is pressed with a timing tB1 and the operation to press the authentication button 35 is completed with a timing tB2 as shown in FIG. 5B. Let the timings tB1 and tB2 to operate the authentication button 35 employed in the cam-coder 2 each be used as a reference. Also assume that a margin e of about 200 ms is provided before and after each of the references. In this case, if the timing tA1 satisfies the relation (tB1−e)<tA1<(tB1+e) and the timing tA2 satisfies the relation (tB2−e)<tA2<(tB2+e), the authentication buttons 26 and 35 are considered to have both been pressed at the same time.

Thus, if the authentication buttons 26 and 35 are pressed with timings (or at times) in a range of allowable time-difference errors normally generated in operations carried out by the user (human being), the mutual authentications carried out by the electronic apparatuses can be considered to give positive results.

It should be noted that, while the timings tB1 and tB2 to operate the authentication button 35 employed in the cam-coder 2 are each used as a reference, the timings tA1 and tA2 to operate the authentication button 26 employed in the PC 1 can also each used as a reference as well.

In addition, in the embodiment described above, while the authentication buttons 26 and 35 used specially for mutual authentication of the PC 1 and the cam-coder 2 are both operated, special buttons are not necessarily required. For example, a predetermined button of the keyboard can be used as a substitute for the authentication button 26 of the PC 1. As for the cam-coder 2, a button, such as a halt button, which has nothing to do with the authentication operation can be used as a substitute for the authentication button 35.

The authentication buttons 26 and 35 are each a press button. However, they can each be a button of any type as long as the button can be switched from an on state to an off state and vice versa. For example, a rotary-press-type operation device, such as a jog dial, can be used as a substitute for each of the authentication buttons 26 and 35. The authentication buttons 26 and 35 can also be replaced by a touch panel, the on and off states of which are determined by whether or not the touch panel is being touched by the user.

Figure 6:
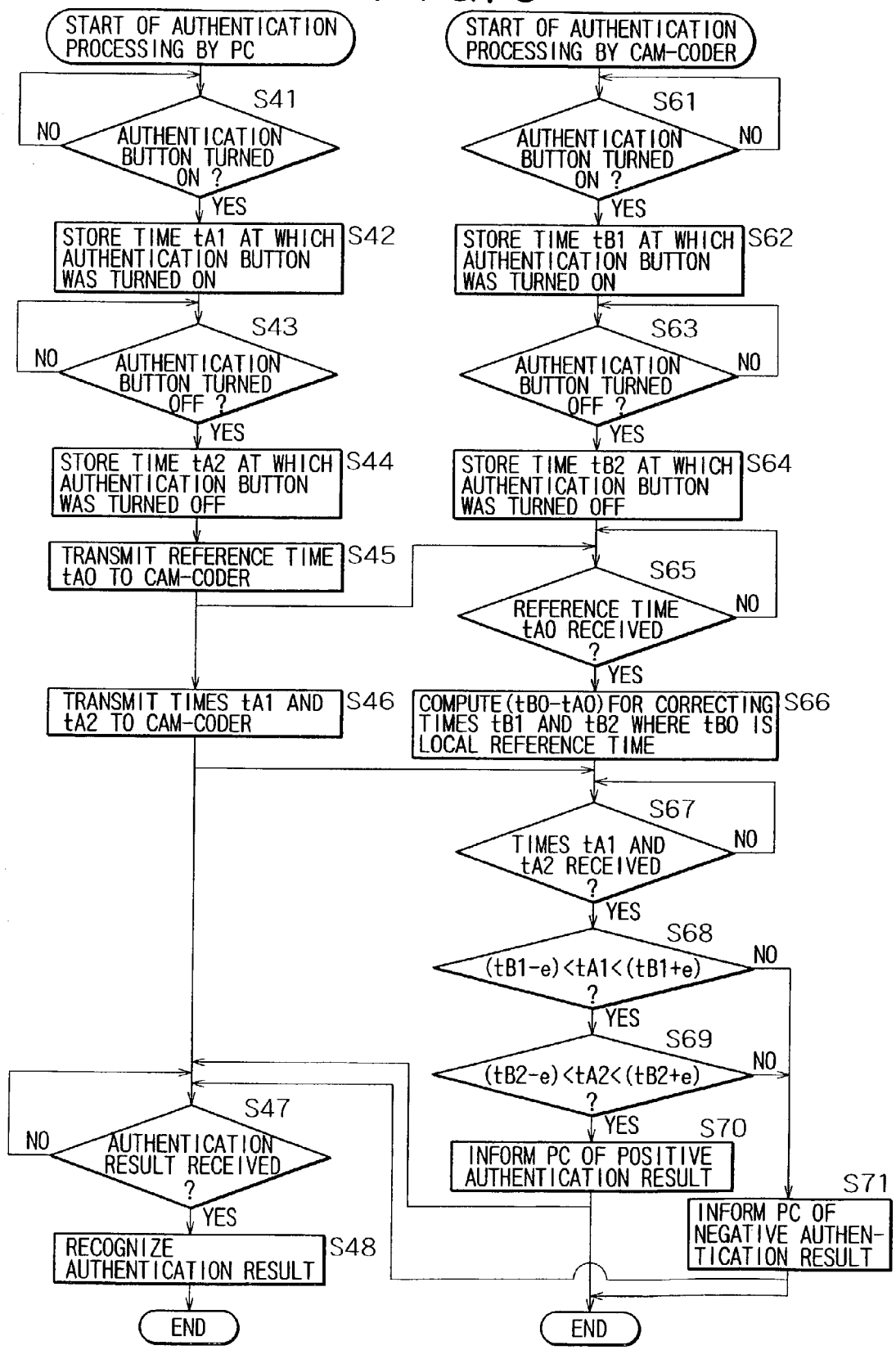
FIG. 6 is a flowchart referred to in explanation of authentication processing provided by the present invention.

By referring to a flowchart shown in FIG. 6, the next description explains operations of the authentication processing carried out by the PC 1 and the cam-coder 2.

As shown in the figure, the flowchart begins with a step S41 at which the authentication program 22a of the PC 1 determines whether or not the authentication button 26 has been turned on (or pressed). If the authentication button 26 has not been turned on, the determination is made repeatedly till the outcome of the determination indicates that the authentication button 26 has been turned on. As the authentication button 26 is turned on, the flow of the program goes on to a step S42. At this step, the authentication program 22a recognizes a time tA1, at which the authentication button 26 is turned on, that is pressed, and stores the time tA1.

Then, at the next step S43, the authentication program 22a of the PC 1 determines whether or not the authentication button 26 has been turned off, that is, the on state of the authentication button 26 has been ended. If the authentication button 26 has not been turned off, the determination is made repeatedly till the outcome of the determination indicates that the authentication button 26 has been turned off. As the authentication button 26 is turned off, the flow of the program goes on to a step S44. At this step, the authentication program 22a recognizes a time tA2, at which the authentication button 26 is turned off, that is released, and stores the time tA2 In the mean time, at steps S61 to S64, the authentication program 32a of the cam-coder 2 also carries out the same processing as that of the authentication program 22a of the PC 1. To put it in detail, at the step S61, the authentication program 32a of the cam-coder 2 determines whether or not the authentication button 35 has been turned on (or pressed). If the authentication button 35 has not been turned on, the determination is made repeatedly till the outcome of the determination indicates that the authentication button 35 has been turned on. As the authentication button 35 is turned on, the flow of the program goes on to a step S62. At this step, the authentication program 32a recognizes a time tB1, at which the authentication button 35 is turned on, that is pressed, and stores the time tB1.

Then, at the next step S63, the authentication program 32a of the cam-coder 2 determines whether or not the authentication button 35 has been turned off, that is, the on state of the authentication button 35 has been ended. If the authentication button 35 has not been turned off, the determination is made repeatedly till the outcome of the determination indicates that the authentication button 35 has been turned off. As the authentication button 35 is turned off, the flow of the program goes on to a step S64. At this step, the authentication program 32a recognizes a time tB2, at which the authentication button 35 is turned off, that is released, and stores the time tB2.

At a step S45, the authentication program 22a of the PC 1 controls the communication unit 25 to transmit a reference time tA0 to the cam-coder 2.

At a step S65, the authentication program 32a of the cam-coder 2 controls the communication unit 36 to determine whether or not the reference time tA0 has been received. If the reference time tA0 has not been received, the determination is made repeatedly till the outcome of the determination indicates that the reference time tA0 has been received. As the reference time tA0 is received, the flow of the program goes on to a step S66 at which a reference-time difference (tB0−tA0) is found where notation tB0 denotes a local reference time of the cam-coder 2. The reference-time difference (tB0−tA0) is used for correcting the times tB1 and tB2. More specifically, the times tB1 and tB2 recognized by the cam-coder 2 are to be compared with the times tA1 and tA2 recognized by the PC 1. Thus, the times tB1 and tB2 each need to be corrected by a correction quantity, which is the reference-time difference (tB0−tA0). The reference time tA0 received from the PC 1 is generated by the PC 1 on the basis of a real-time clock signal of the PC 1. By the same token, the reference time tB0 is generated by the cam-coder 2 on the basis of a real-time clock signal of the cam-coder 2. The times tB1 and tB2 are corrected in accordance with Eqs. (1) and (2) respectively as follows:

$$\text{Post-correction } tB1 = \text{Pre-correction } tB1 - (tB0 - tA0) \quad (1)$$

$$\text{Post-correction } tB2 = \text{Pre-correction } tB2 - (tB0 - tA0) \quad (2)$$

At a step S46, the authentication program 22a controls the communication unit 25 to transmit the times tA1 and tA2 to the cam-coder 2.

At a step S67, the authentication program 32a of the cam-coder 2 determines whether or not information on the times tA1 and tA2 has been received from the PC 1. If the information on the times tA1 and tA2 has not been received, the determination is made repeatedly till the outcome of the determination indicates that the information has been received. As the information on the times tA1 and tA2 is received, the flow of the program goes on to a step S68.

At the step S68, the authentication program 32a determines whether or not tA1 satisfies a relation (tB1−e)<tA1<(tB1+e). If the result of the determination indicates that tA1 satisfies the relation as is the case with an example shown in FIG. 5, the flow of the program goes on to a step S69.

At the step S69, the authentication program 32a determines whether or not tA2 satisfies a relation (tB2−e)<tA2<(tB2+e). If the result of the determination indicates that tA2 satisfies the relation as is the case with the example shown in FIG. 5, the flow of the program goes on to a step S70 at which the PC 1 is notified that the result of the authentication is positive.

At a step S47, the authentication program 22a of the PC 1 determines whether or not the notice issued at the step S70 has been received. If the notice has not been received, the determination is made repeatedly till the outcome of the determination indicates that the notice has been received. As the notice is received, the flow of the program goes on to a step S48 at which the authentication program 22a of the PC 1 accepts the result of the authentication, recognizing the authentication in this case.

If the outcome of the determination made at the step S68 indicates that tA1 does not satisfy the relation (tB1−e)<tA1<(tB1+e) or the outcome of the determination made at the step S69 indicates that tA2 does not satisfy the relation (tB2−e)<tA2<(tB2+e) on the other hand, the flow of the program goes on to a step S71 at which the authentication program 32a does not recognize the authentication, that is, the authentication program 32a recognizes the fact that the authentication buttons 26 and 35 were not operated at the same time, and control the communication unit 36 to notify the PC 1 that the result of the authentication is negative.

In the embodiment described above, the cam-coder 2 carries out authentication determination processing to verify that the authentication button 26 employed in the PC 1 and the authentication button 35 employed in the cam-coder 2 have been operated at the same time. It is needless to say that the PC 1 can also carry out the authentication determination processing, that is, the processing of the steps S68 and S69.

In addition, both the PC 1 and the cam-coder 2 can carry out mutually the authentication determination processing, that is, the processing of the steps S68 and S69 as is shown in a flowchart of FIG. 7 described as follows.

Figure 7:
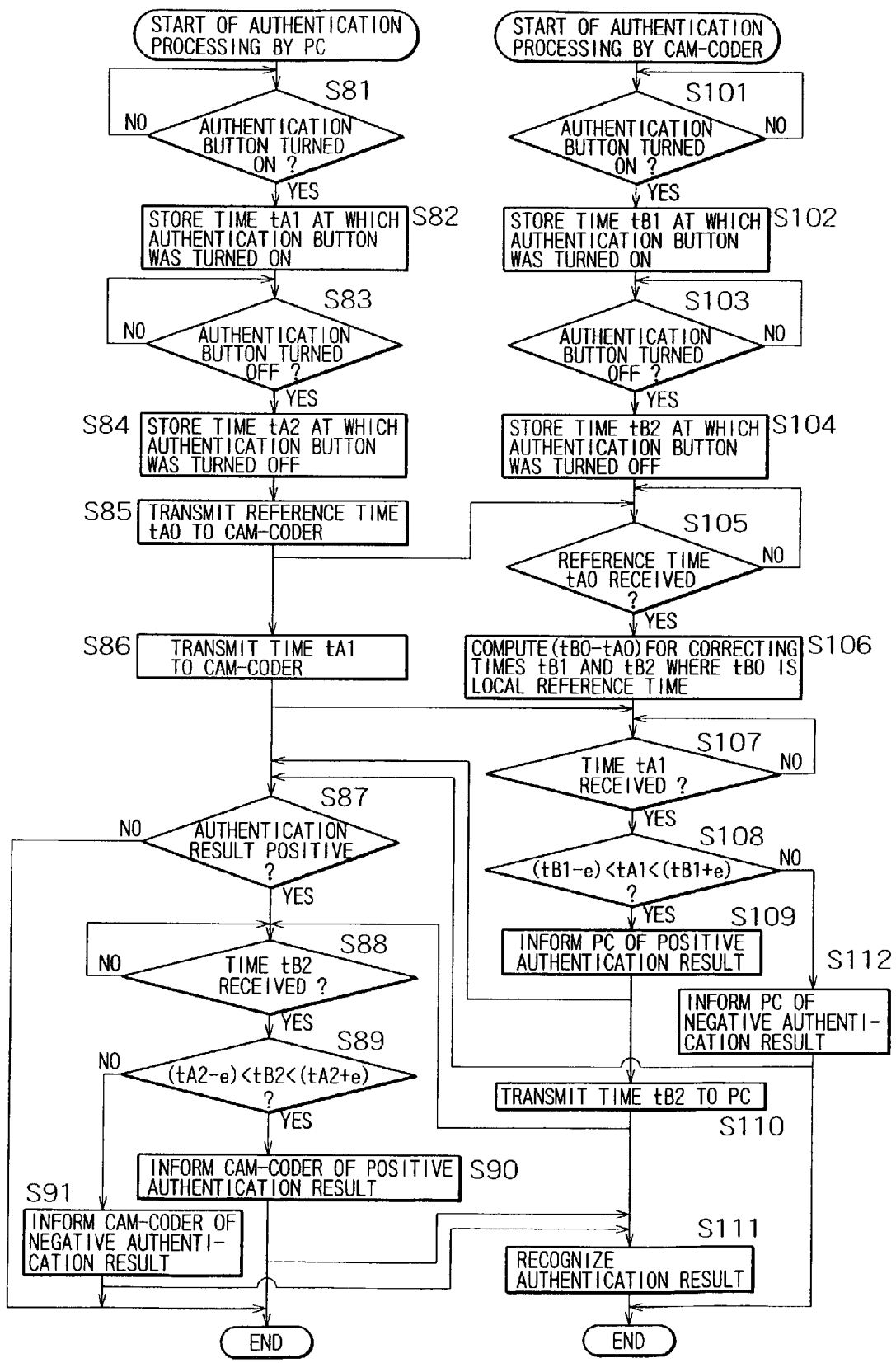
FIG. 7 is a flowchart referred to in explanation of authentication processing provided by the present invention.

As shown in FIG. 7, the flowchart begins with a step S81 at which the authentication program 22a of the PC 1 determines whether or not the authentication button 26 has been turned on (or pressed). If the authentication button 26 has not been turned on, the determination is made repeatedly till the outcome of the determination indicates that the authentication button 26 has been turned on. As the authentication button 26 is turned on, the flow of the program goes on to a step S82. At this step, the authentication program 22a recognizes a time tA1, at which the authentication button 26 is turned on, that is pressed, and stores the time tA1.

Then, at the next step S83, the authentication program 22a of the PC 1 determines whether or not the authentication button 26 has been turned off, that is, the on state of the authentication button 26 has been ended. If the authentication button 26 has not been turned off, the determination is made repeatedly till the outcome of the determination indicates that the authentication button 26 has been turned off. As the authentication button 26 is turned off, the flow of the program goes on to a step S84. At this step, the authentication program 22a recognizes a time tA2, at which the authentication button 26 is turned off, that is released, and stores the time tA2.

In the mean time, at steps S101 to S104, the authentication program 32a of the cam-coder 2 also carries out the same processing as that of the authentication program 22a of the PC 1. To put it in detail, at the step S101, the authentication program 32a of the cam-coder 2 determines whether or not the authentication button 35 has been turned on (or pressed). If the authentication button 35 has not been turned on, the determination is made repeatedly till the outcome of the determination indicates that the authentication button 35 has been turned on. As the authentication button 35 is turned on, the flow of the program goes on to a step S102. At this step, the authentication program 32a recognizes a time tB1, at which the authentication button 35 is turned on, that is pressed, and stores the time tB1.

Then, at the next step S103, the authentication program 32a of the cam-coder 2 determines whether or not the authentication button 35 has been turned off, that is, the on state of the authentication button 35 has been ended. If the authentication button 35 has not been turned off, the determination is made repeatedly till the outcome of the determination indicates that the authentication button 35 has been turned off. As the authentication button 35 is turned off, the flow of the program goes on to a step S104. At this step, the authentication program 32a recognizes a time tB2, at which the authentication button 35 is turned off, that is released, and stores the time tB2.

At a step S85, the authentication program 22a of the PC 1 controls the communication unit 25 to transmit a reference time tA0 to the cam-coder 2.

At a step S105, the authentication program 32a of the cam-coder 2 controls the communication unit 36 to determine whether or not the reference time tA0 has been received. If the reference time tA0 has not been received, the determination is made repeatedly till the outcome of the determination indicates that the reference time tA0 has been received. As the reference time tA0 is received, the flow of the program goes on to a step S106 at which a reference-time difference (tB0−tA0) is found where notation tB0 denotes a local reference time of the cam-coder 2. The reference-time difference (tB0−tA0) is used for correcting the times tB1 and tB2.

At a step S86, the authentication program 22a controls the communication unit 25 to transmit the time tA1 to the cam-coder 2.

At a step S107, the authentication program 32a of the cam-coder 2 determines whether or not information on the time tA1 has been received from the PC 1. If the information on the time tA1 has not been received, the determination is made repeatedly till the outcome of the determination indicates that the information has been received. As the information on the time tA1 is received, the flow of the program goes on to a step S108.

Figure 8:
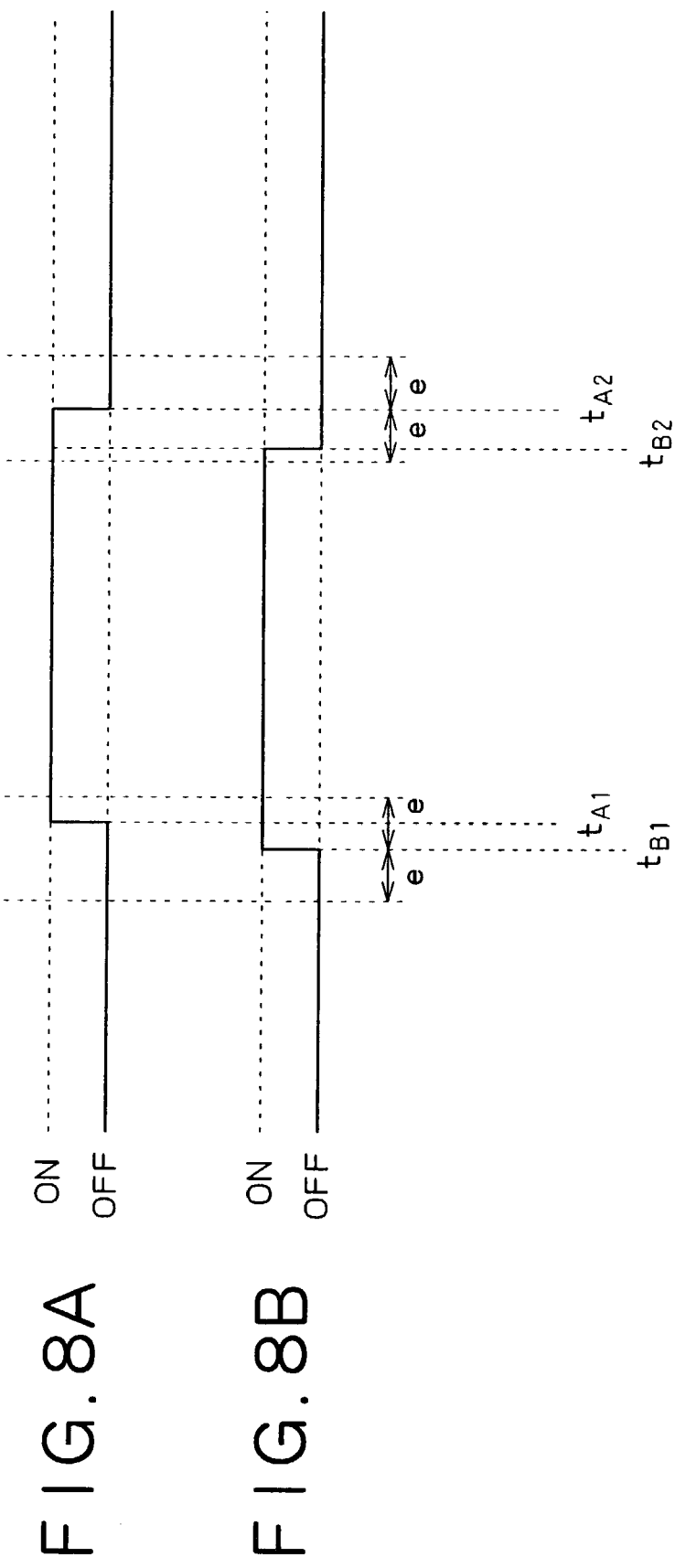
FIGS. 8A and 8B are timing charts showing a timing with which an authentication button is pressed.

At the step S108, the authentication program 32a determines whether or not tA1 satisfies a relation (tB1−e)<tA1< (tB1+e). If the result of the determination indicates that tA1 satisfies the relation as is the case with an example shown in FIG. 8B, the flow of the program goes on to a step S109.

At the step S109, the authentication program 32a controls the communication unit 36 to notify the PC 1 that the result of the authentication is positive.

At a step S87, the authentication program 22a of the PC 1 determines whether or not the notice issued at the step S109 has been received. If the notice has not been received, the determination is made repeatedly till the outcome of the determination indicates that the notice has been received. As the notice is received, the flow of the program goes on to a step S88.

At the step S110, the authentication program 32a controls the communication unit 36 to transmit the time tB2 to the PC 1.

At a step S88, the authentication program 22a of the PC 1 controls the communication unit 25 to determine whether or not the time tB2 has been received from the cam-coder 2. If the time tB2 has not been received, the determination is made repeatedly till the outcome of the determination indicates that the time tB2 has been received. As the time tB2 is received, the flow of the program goes on to a step S89.

At the step S89, the authentication program 22a determines whether or not tB2 satisfies a relation (tA2−e)<tB2< (tA2+e). If the result of the determination indicates that tB2 satisfies the relation as is the case with an example shown in FIG. 8A, the flow of the program goes on to a step S90 at which the authentication program 22a controls the communication unit 25 to notify the cam-coder 2 that the result of the authentication is positive.

At a step S111, the authentication program 32a of the cam-coder 2 receives the authentication result transmitted by the PC 1 at the step S90 and accepts it. In this case, the result of the authentication is positive.

If the determination made at the step S108 indicates that tA1 does not satisfy the relation (tB1−e)<tA1<(tB1+e), on the other hand, the flow of the program goes on to a step S112 at which the authentication program 32a does not recognize the authentication, that is, the authentication program 32a recognizes the fact that the authentication buttons 26 and 35 were not operated at the same time, and controls the communication unit 36 to notify the PC 1 that the result of the authentication is negative.

As a result, the outcome of the determination made by the authentication program 22a at the step S87 indicates that the result of the authentication is negative. In this case, the authentication processing is ended.

If the determination made at the step S89 indicates that tB2 does not satisfy a relation (tA2−e)<tB2<(tA2+e), on the other hand, the flow of the program goes on to a step S91 at which the authentication program 22a of the PC 1 controls the communication unit 25 to notify the cam-coder 2 that the result of the authentication is negative.

As described above, the cam-coder 2 compares the timings with which the authentication buttons 26 and 35 are pressed. On the other hand, the PC 1 compares the timings with which the operations to press the authentication buttons 26 and 35 are terminated. In this way, the PC 1 and the cam-coder 2 are capable of carrying out mutual authentication processing. Of course, as opposed to the embodiment described above, the PC 1 may compare the timings with which the authentication buttons 26 and 35 are pressed while the cam-coder 2 may compare the timings with which the operations to press the authentication buttons 26 and 35 are terminated.

In the embodiment described above, the authentication buttons 26 and 35 are each pressed only once. By pressing the authentication buttons 26 and 35 only once, however, it is quite within the bounds of possibility that incorrect operations may produce a positive result incidentally. In order to solve this problem, the authentication buttons 26 and 35 are each pressed a number of times so that it is possible to prevent incorrect operations from producing a positive result incidentally.

Figure 9:
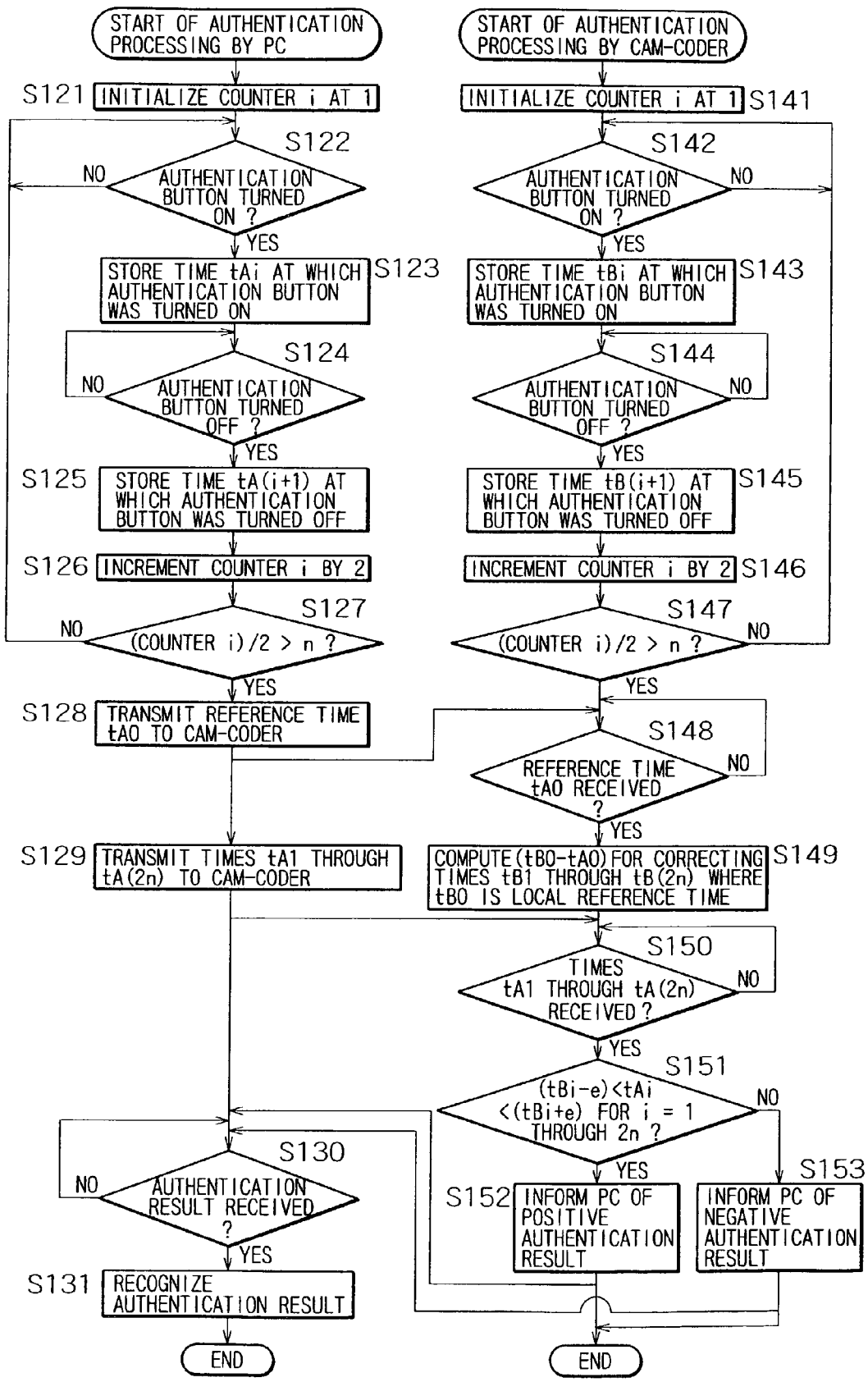
FIG. 9 is a flowchart referred to in explanation of authentication processing provided by the present invention.

By referring to a flowchart shown in FIG. 9, the following description explains a case in which the authentication buttons 26 and 35 are pressed alternately a number of times such as typically n times. In this case, the authentication programs 22a and 32a each include a counter i for counting the number of times the associated authentication buttons are pressed.

As shown in FIG. 9, the flowchart begins with a step S121 at which the authentication program 22a of the PC 1 initializes its own counter i at 1. Then, at the next step S122, the authentication program 22a of the PC 1 determines whether or not the authentication button 26 has been turned on (or pressed). If the authentication button 26 has not been turned on, the determination is made repeatedly till the outcome of the determination indicates that the authentication button 26 has been turned on. As the authentication button 26 is turned on, the flow of the program goes on to a step S123. At this step, the authentication program 22a recognizes a time tAi, at which the authentication button 26 is turned on, that is pressed, and stores the time tAi.

Then, at the next step S124, the authentication program 22a of the PC 1 determines whether or not the authentication button 26 has been turned off, that is, the on state of the authentication button 26 has been ended. If the authentication button 26 has not been turned off, the determination is made repeatedly till the outcome of the determination indicates that the authentication button 26 has been turned off. As the authentication button 26 is turned off, the flow of the program goes on to a step S125. At this step, the authentication program 22a recognizes a time tA(i+1), at which the authentication button 26 is turned off, that is released, and stores the time tA(i+1). Then, at the next step S126, the authentication program 22a increments its own counter i by 2. Subsequently, the flow of the program goes on to a step S127 to determine whether or not the value of (counter i)/2 is greater than n, where the notation n denotes the number of times the authentication button 26 is to be pressed. If the outcome of the determination indicates that the value of (counter i)/2 is not greater than n, the flow of the program goes back to the step S122 to repeat the processing of this step and the subsequent steps. While the processing of the steps S122 to S126 is being carried out repeatedly, the counter i is incremented. As the outcome of the determination made at the step S127 indicates that the value of (counter i)/2 exceeds n, the flow of the program goes on to a step S128.

In the mean time, at steps S141 to S147, the authentication program 32a of the cam-coder 2 also carries out the same processing as that of the authentication program 22a of the PC 1. To put it in detail, at the step S141, the authentication program 32a of the cam-coder 2 initializes its own counter i at 1. Then, at the next step S142, the authentication program 32a of the cam-coder 2 determines whether or not the authentication button 35 has been turned on (or pressed). If the authentication button 35 has not been turned on, the determination is made repeatedly till the outcome of the determination indicates that the authentication button 35 has been turned on. As the authentication button 35 is turned on, the flow of the program goes on to a step S143. At this step, the authentication program 32a recognizes a time tBi, at which the authentication button 35 is turned on, that is pressed, and stores the time tBi.

Then, at the next step S144, the authentication program 32a of the cam-coder 2 determines whether or not the authentication button 35 has been turned off, that is, the on state of the authentication button 35 has been ended. If the authentication button 35 has not been turned off, the determination is made repeatedly till the outcome of the determination indicates that the authentication button 35 has been turned off. As the authentication button 35 is turned off, the flow of the program goes on to a step S145. At this step, the authentication program 32a recognizes a time tB(i+1), at which the authentication button 35 is turned off, that is released, and stores the time tB(i+1).

Then, at a step S146, the authentication program 32a of the cam-coder 2 increments its own counter i by 2. Subsequently, the flow of the program goes on to a step S147 to determine whether or not the value of (counter i)/2 is greater than n, where the notation n denotes the number of times the authentication button 35 is to be pressed. If the outcome of the determination indicates that the value of (counter i)/2 is not greater than n, the flow of the program goes back to the step S142 to repeat the processing of this step and the subsequent steps. While the processing of the steps S142 to S146 is being carried out repeatedly, the counter i is incremented. As the outcome of the determination made at the step S147 indicates that the value of (counter i)/2 exceeds n, the flow of the program goes on to a step S148.

At a step S128, the authentication program 22a of the PC 1 controls the communication unit 25 to transmit a reference time tA0 to the cam-coder 2.

At the step S148, the authentication program 32a of the cam-coder 2 controls the communication unit 36 to determine whether or not the reference time tA0 has been received. If the reference time tA0 has not been received, the determination is made repeatedly till the outcome of the determination indicates that the reference time tA0 has been received. As the reference time tA0 is received, the flow of the program goes on to a step S149 at which a reference-time difference (tB−tA0) is found where notation tB0 denotes a local reference time of the cam-coder 2. The reference-time difference (tB0−tA0) is used for correcting the times tB1, tB2 through tB(2n).

At a step S129, the authentication program 22a controls the communication unit 25 to transmit the times tA1, tA2 through tA(2n) to the cam-coder 2.

At a step S150, the authentication program 32a of the cam-coder 2 determines whether or not information on the times tA1 through tA(2n), has been received. If the information on the times tA1 through tA(2n) has not been received, the determination is made repeatedly till the outcome of the determination indicates that the information has been received. As the information on the times tA1 through tA($2n$) is received, the flow of the program goes on to a step S151.

Figure 10:
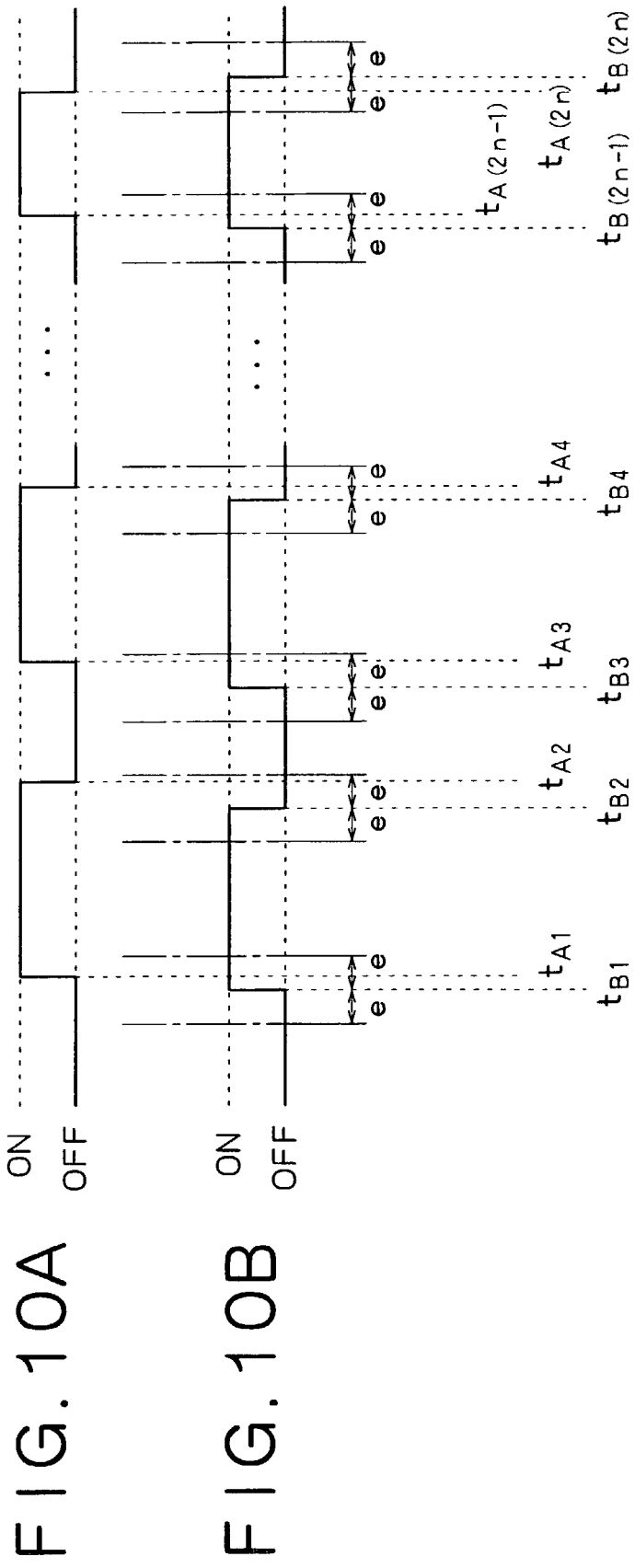
FIGS. 10A and 10B are timing charts showing a timing with which an authentication button is pressed.

At the step S151, the authentication program 32a determines whether or not tAi satisfies a relation (tBi−e)<tAi<(tBi+e) where i=1 through $2n$. If the result of the determination indicates that tAi satisfies the relation as is the case with an example shown in FIGS. 10A and 10B, the flow of the program goes on to a step S152. As shown in the figure, the relations (tB1−e)<tA1<(tB1+e), (tB2−e)<tA2<(tB2+e), (tB3−e)<tA3<(tB3+e), (tB4−e)<tA4<(tB4+e) through {tB($2n$−1)−e}<tA($2n$−1)<{tB($2n$−1)+e} and {tB($2n$)−e}<tA($2n$)<{tB($2n$)+e} are satisfied. At the step S152, the authentication program 32a controls the communication unit 36 to notify the PC 1 that the result of the authentication is positive.

At a step S130, the authentication program 22a of the PC 1 determines whether or not the notice issued at the step S152 has been received. If the notice has not been received, the determination is made repeatedly till the outcome of the determination indicates that the notice has been received. As the notice is received, the flow of the program goes on to a step S131 at which the authentication program 22a of the PC 1 accepts the authentication result, which is positive in this case.

If the result of the determination made at the step S151 indicates that tAi does not satisfy the relation (tBi−e)<tAi<(tBi+e) where i=1 through $2n$, on the other hand, the flow of the program goes on to a step S153 at which the authentication program 32a does not recognize the authentication, that is, the authentication program 32a recognizes the fact that the authentication buttons 26 and 35 were not operated at the same time, and controls the communication unit 36 to notify the PC 1 that the result of the authentication is negative.

In the embodiment described above, the cam-coder 2 carries out processing to determine whether or not the authentication button 35 has been pressed simultaneously with the authentication button 26 employed in the PC 1 a plurality of times. It is needless to say that, instead of the cam-coder 2, the PC 1 can also carry out the same authentication-forming determination, that is, the processing performed at the step S151 of the flowchart shown in FIG. 9.

In addition, for an application in which the authentication buttons 26 and 35 are pressed a number of times, both the PC 1 and the cam-coder 2 may carry out mutual-authentication processing as is the case with the embodiment represented by the flowchart shown in FIG. 7. By referring to a flowchart shown in FIG. 11, the following description explains the application in which the authentication buttons 26 and 35 are pressed a number of times, and the PC 1 as well as the cam-coder 2 carry out mutual-authentication processing.

Figure 11:
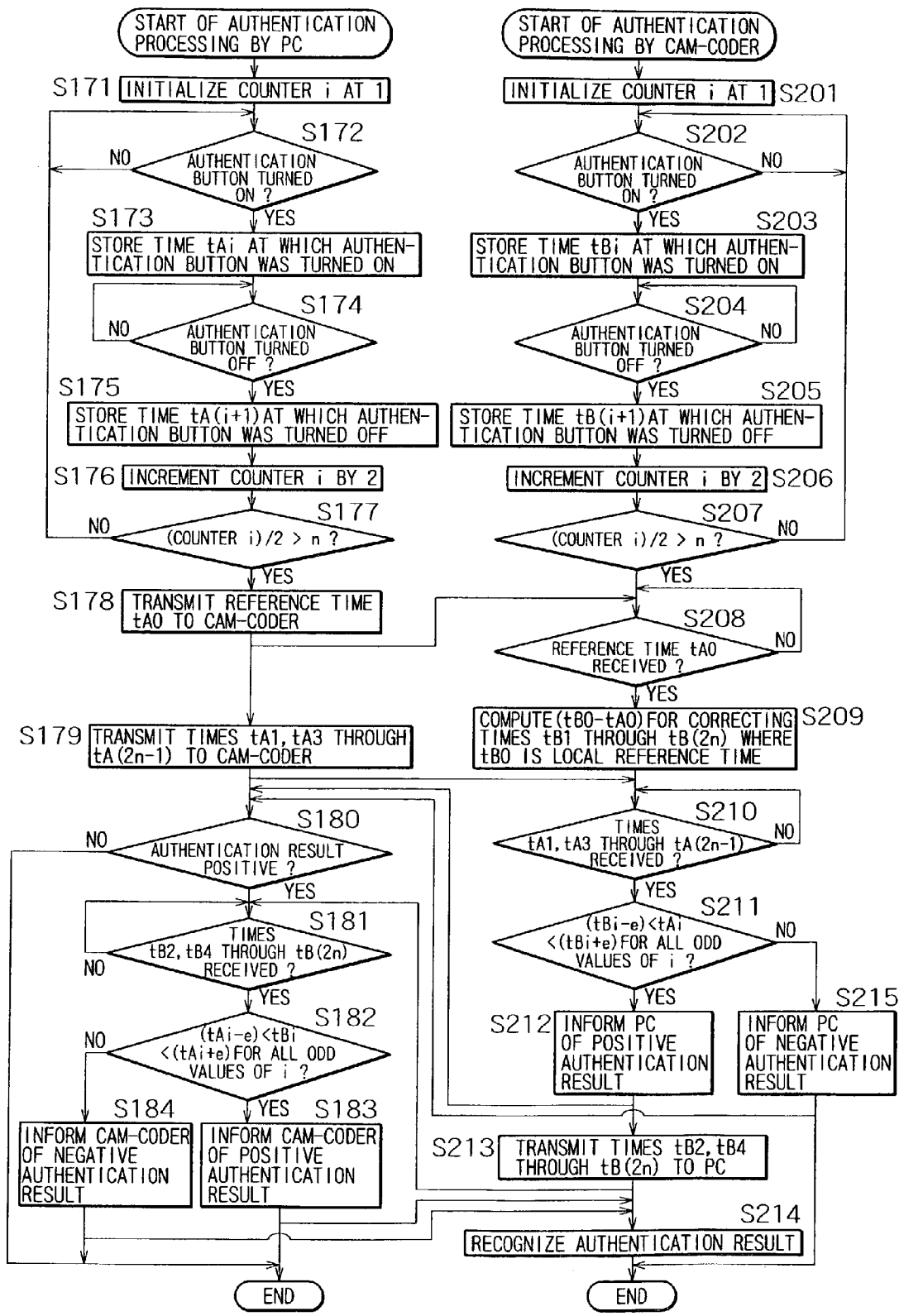
FIG. 11 is a flowchart referred to in explanation of authentication processing provided by the present invention.

As shown in FIG. 11, the flowchart begins with a step S171 at which the authentication program 22a of the PC 1 initializes its own counter i at 1. Then, at the next step S172, the authentication program 22a of the PC 1 determines whether or not the authentication button 26 has been turned on (or pressed). If the authentication button 26 has not been turned on, the determination is made repeatedly till the outcome of the determination indicates that the authentication button 26 has been turned on. As the authentication button 26 is turned on, the flow of the program goes on to a step S173. At this step, the authentication program 22a recognizes a time tAi, at which the authentication button 26 is turned on, that is pressed, and stores the time tAi.A Then, at the next step S174, the authentication program 22a of the PC 1 determines whether or not the authentication button 26 has been turned off, that is, the on state of the authentication button 26 has been ended. If the authentication button 26 has not been turned off, the determination is made repeatedly till the outcome of the determination indicates that the authentication button 26 has been turned off. As the authentication button 26 is turned off, the flow of the program goes on to a step S175. At this step, the authentication program 22a recognizes a time tA(i+1), at which the authentication button 26 is turned off, that is released, and stores the time tA(i+1).

Then, at the next step S176, the authentication program 22a increments its own counter i by 2. Subsequently, the flow of the program goes on to a step S177 to determine whether or not the value of (counter i)/2 is greater than n, where the notation n denotes the number of times the authentication button 26 is to be pressed. If the outcome of the determination indicates that the value of (counter i)/2 is not greater than n, the flow of the program goes back to the step S172 to repeat the processing of this step and the subsequent steps. While the processing of the steps S172 to S176 is being carried out repeatedly, the counter i is incremented. As the outcome of the determination made at the step S177 indicates that the value of (counter i)/2 exceeds n, the flow of the program goes on to a step S178.

In the mean time, at steps S201 to S207, the authentication program 32a of the cam-coder 2 also carries out the same processing as that of the authentication program 22a of the PC 1. To put it in detail, at the step S201, the authentication program 32a of the cam-coder 2 initializes its own counter i at 1. Then, at the next step S202, the authentication program 32a of the cam-coder 2 determines whether or not the authentication button 35 has been turned on (or pressed). If the authentication button 35 has not been turned on, the determination is made repeatedly till the outcome of the determination indicates that the authentication button 35 has been turned on. As the authentication button 35 is turned on, the flow of the program goes on to a step S203. At this step, the authentication program 32a recognizes a time tBi, at which the authentication button 35 is turned on, that is pressed, and stores the time tBi.

Then, at the next step S204, the authentication program 32a of the cam-coder 2 determines whether or not the authentication button 35 has been turned off, that is, the on state of the authentication button 35 has been ended. If the authentication button 35 has not been turned off, the determination is made repeatedly till the outcome of the determination indicates that the authentication button 35 has been turned off. As the authentication button 35 is turned off, the flow of the program goes on to a step S205. At this step, the authentication program 32a recognizes a time tB(i+1), at which the authentication button 35 is turned off, that is released, and stores the time tB(i+1).

Then, at a step S206, the authentication program 32a increments its own counter i by 2. Subsequently, the flow of the program goes on to a step S207 to determine whether or not the value of (counter i)/2 is greater than n, where the notation n denotes the number of times the authentication button 35 is to be pressed. If the outcome of the determination indicates that the value of (counter i)/2 is not greater than n, the flow of the program goes back to the step S202 to repeat the processing of this step and the subsequent steps. While the processing of the steps S202 to S206 is being carried out repeatedly, the counter i is incremented. As the outcome of the determination made at the step S207 indicates that the value of (counter i)/2 exceeds n, the flow of the program goes on to a step S208.

At a step S178, the authentication program 22a of the PC 1 controls the communication unit 25 to transmit a reference time tA0 to the cam-coder 2.

At the step S208, the authentication program 32a of the cam-coder 2 controls the communication unit 36 to determine whether or not the reference time tA0 has been received. If the reference time tA0 has not been received, the determination is made repeatedly till the outcome of the determination indicates that the reference time tA0 has been received. As the reference time tA0 is received, the flow of the program goes on to a step S209 at which a reference-time difference (tB0−tA0) is found where notation tB0 denotes a local reference time of the cam-coder 2. The reference-time difference (tB0−tA0) is used for correcting the times tB1, tB2 through tB(2n).

At a step S179, the authentication program 22a controls the communication unit 25 to transmit the times tAi where i represent odd integers, that is, the times tA1, tA3 through tA(2n−1), to the cam-coder 2.

At a step S210, the authentication program 32a of the cam-coder 2 determines whether or not information on the times tAi where i represents odd integers in the range 1 through (2n−1), that is, the times tA1, tA3 through tA(2n−1), has been received from the PC 1. If the information on the times tAi has not been received, the determination is made repeatedly till the outcome of the determination indicates that the information has been received. As the information on the times tAi is received, the flow of the program goes on to a step S211.

At the step S211, the authentication program 32a determines whether or not tAi satisfies a relation (tBi−e)<tAi< (tBi+e) where i represents odd integers in the range 1 through (2n−1). If the result of the determination indicates that tAi satisfies the relation as is the case with an example shown in FIG. 12B, the flow of the program goes on to a step S212. As shown in the figure, the relations (tB1−e)<tA1< (tB1+e), (tB3−e)<tA3<(tB3+e) through {tB(2n−1)−e}<tA (2n−1)<{tB(2n−1)+e} are satisfied. At the step S212, the authentication program 32a controls the communication unit 36 to notify the PC 1 that the result of the authentication is positive.

At a step S180, the authentication program 22a of the PC 1 determines whether or not the notice issued at the step S212 has been received. If the notice has not been received, the determination is made repeatedly till the outcome of the determination indicates that the notice has been received. As the notice is received, the flow of the program goes on to a step S181.

At a step S213, the authentication program 32a controls the communication unit 36 to transmit the times tBi where i represent even integers, that is, the times tB2, tB4 through tB(2n), to the PC 1.

At a step S181, the authentication program 22a of the PC 1 determines whether or not information on the times tB2, tB4 through tB(2n), has been received from the cam-coder 2. If the information on the times has not been received, the determination is made repeatedly till the outcome of the determination indicates that the information has been received. As the information on the times is received, the flow of the program goes on to a step S182.

At the step S182, the authentication program 22a determines whether or not tBi satisfies a relation (tAi−e)<tBi< (tAi+e) where i represents even integers in the range 2 to 2n. If the result of the determination indicates that tAi satisfies the relation as is the case with an example shown in FIG. 12A, the flow of the program goes on to a step S183 As shown in the figure, the relations (tA2−e)<tB2<(tA2+e), (tA4−e)<tB4<(tA4+e) through {tA(2n)−e}<tB(2n)<{tA (2n)+e} are satisfied. At the step S183, the authentication program 22a controls the communication unit 25 to notify the cam-coder 2 that the result of the authentication is positive.

At a step S214, the authentication program 32a of the cam-coder 2 receives the notice issued by the PC 1 at the step S183 and accepts the result of the authentication. In this case, the result of the authentication is positive.

If the result of the determination made at the step S211 indicates that tAi does not satisfy the relation (tBi−e)<tAi< (tBi+e) where i represents odd integers in the range i=1 to (2n−1), on the other hand, the flow of the program goes on to a step S215 at which the authentication program 32a does not recognize the authentication, that is, the authentication program 32a recognizes the fact that the authentication buttons 26 and 35 were not operated a number of times at the same time, and controls the communication unit 36 to notify the PC 1 that the result of the authentication is negative.

As a result, at the step S180, the authentication program 22a determines that the result of the authentication is negative, and ends the execution of the program.

By the same token, if the result of the determination made at the step S182 indicates that tBi does not satisfy the relation (tAi−e)<tBi<(tAi+e) where i represents even integers in the range i=2 to 2n, on the other hand, the flow of the program goes on to a step S184 at which the authentication program 22a of the PC 1 does not recognize the authentication, and controls the communication unit 25 to notify the cam-coder 2 that the result of the authentication is negative.

As described above, both the PC 1 and the cam-coder 2 carry out mutual authentication processing on a plurality of time pairs so that a positive authentication result caused accidentally by a malfunction can be avoided.

Figure 1A:
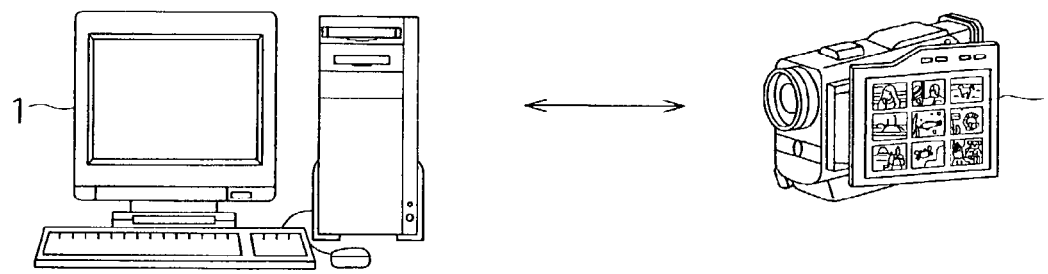
FIGS. 1A through 1D are schematic views showing combinations of electronic apparatuses in the conventional wireless communication.
Figure 1B:
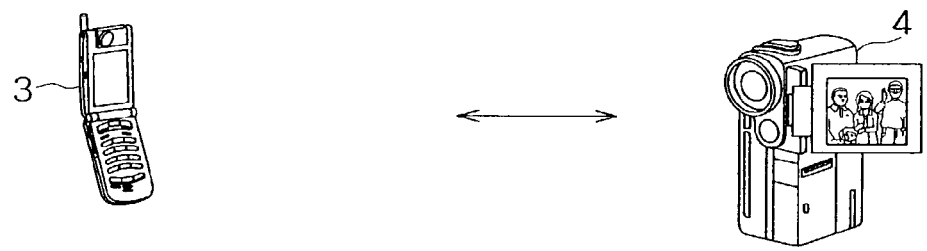
Figure 1C:
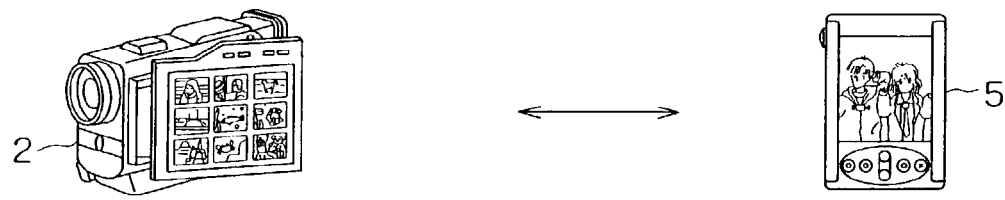
Figure 1D:
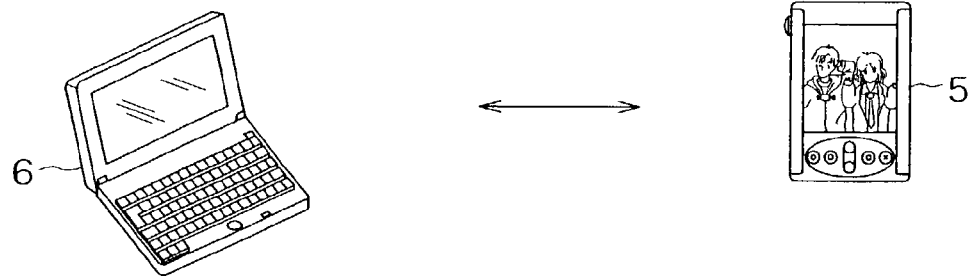
Figure 2:
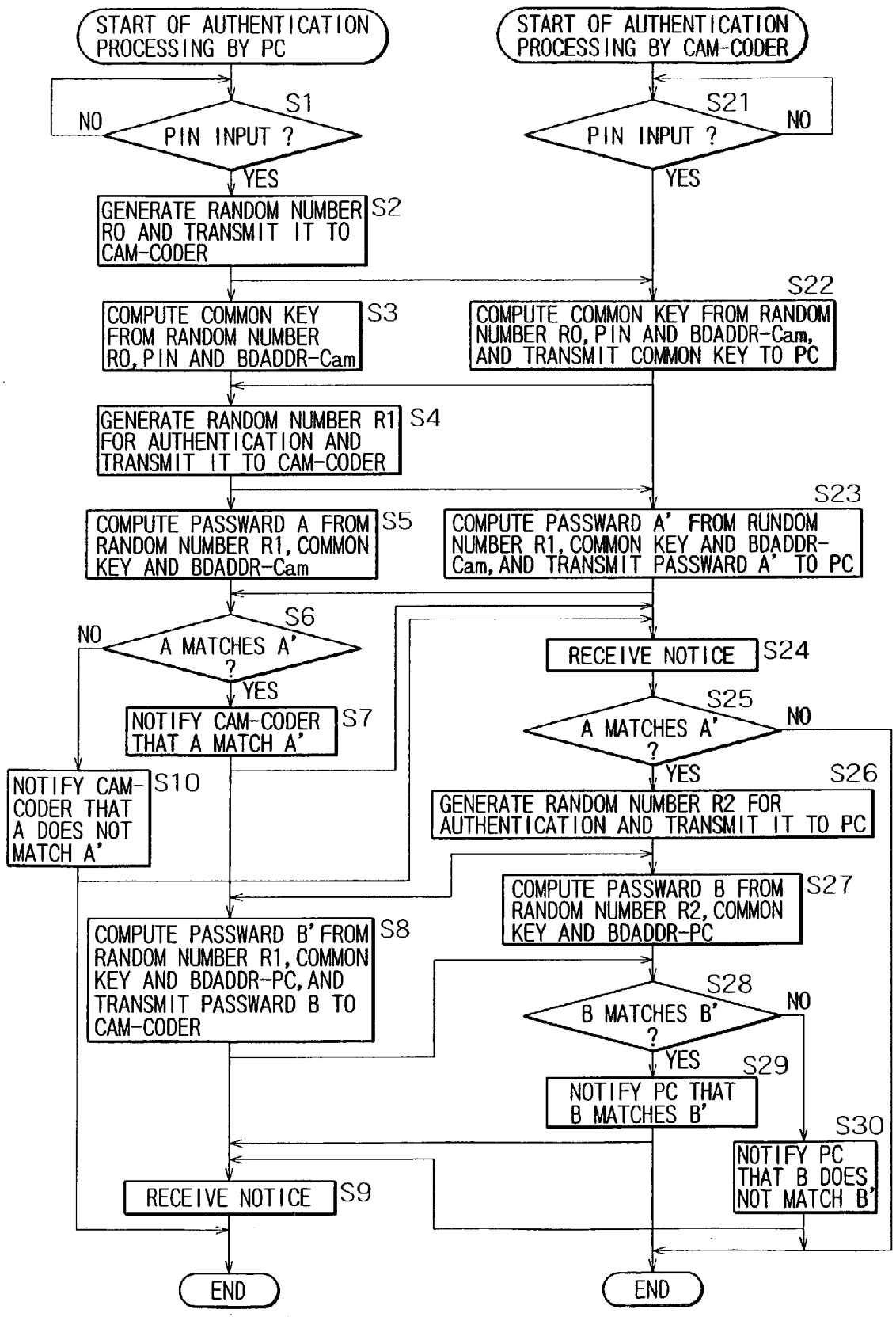
FIG. 2 is a flowchart referred to in explanation of the conventional authentication processing.

In the embodiments described above, authentication processing between the PC 1 and the cam-coder 2 is carried out. However, such processing can be carried out between any electronic apparatuses as long as the apparatuses adopt the Bluetooth communication and connection technique. As is obvious from FIGS. 1B through 1D showing electronic apparatuses connected to each other by adopting the Bluetooth technique, the authentication processing can thus be carried out also between the portable phone 3 and the handy cam-coder 4 as shown in FIG. 1B, between the cam-coder 2 and the portable information communication terminal 5 as shown in FIG. 1C and the portable personal computer 6 and the portable information communication terminal 5 as shown in FIG. 1D.

In addition, in accordance with the Bluetooth standard, by setting PIN at 0, an input specifying a PIN value can be omitted. By using the function for omitting input of the PIN, the initial authentication can be carried out as an authentication conforming to the Bluetooth standard whereas the subsequent authentications can be carried out by adoption of the technique of using authentication buttons as described above.

Furthermore, the number of times (n) the authentication buttons 26 and 35 are to be pressed can be changed each time the authentication processing is carried out.

In the embodiments described above, when the authentication program 22a of the PC 1 and the authentication program 32a of the cam-coder 2 carry out mutual authentication processing, one of the programs compares a timing to press the authentication button 26 with the corresponding timing to press the authentication button 35 while the other program compares a timing to terminate the on state of the authentication button 26 with the corresponding timing to terminate the on state of the authentication button 35. The group of timings to be compared by the authentication program 22a and the group of timings to be compared by the authentication program 32a can each be a group of any timings as long as the group of timings to be compared by the authentication program 22a does not overlap the group of respective timings to be compared by the authentication program 32a.

Moreover, instead of using the reference timing tA0 and tB0, the timing tA1 to initially press the authentication button 26 and the timing tB1 to initially press the authentication button 35 can also each be used as a reference timing. In this case, a difference between tAi and tA1 and a difference between tBi and tB1 are found for i=1 to 2n. Then, the difference between (tAi−tA1) is compared with the difference (tBi−tB1) for i=1 to 2n. Since the timings tA1 and tB1 are each treated as a reference timing, the number of times the remaining timings are to be compared is reduced by 1 because the number of timings to be compared is decreased by 1. However, for n=1, that is, in a case in which the authentication buttons 26 and 35 are each pressed only once, the differences in timing between the authentication buttons 26 and 35 are not available. Thus, each of the authentication buttons 26 and 35 must be pressed a plurality of times and, hence, the on state of each of the authentication buttons 26 and 35 must also be ended a plurality of times as well.

In addition, the present invention has been explained by showing embodiments, which each employ the communication units 25 and 36 each adopting the Bluetooth technique. However, the present invention can be applied to authentication processing in a wireless/wire communication system, which employs communication units adopting technique other than Bluetooth.

The present invention allows authentication processing to be performed by carrying out simple operations.

The series of pieces of processing described above can be carried out by hardware or software. If the series of pieces of processing is implemented by software, a program composing the software can be installed from a recording medium into a computer including embedded special hardware or into a computer of another type such as a general-purpose personal computer capable of carrying out a variety of functions by execution of various programs installed in the personal computer.

A recording medium embedded in the PC 1 is distributed to users in order to present a program recorded in the medium to users. The recording medium for presenting a program recorded in the medium to users is not limited to the hard disk 22. The recording medium can also be a package medium provided separately from the computer. As shown in FIG. 4, examples of the package medium are the magnetic disk 211 including a flexible disk, the optical disk 212 including a CD-ROM (Compact-Disk Read-Only Memory) and a DVD (Digital Versatile Disk), the magneto-optical disk 213 including an MD (Mini-Disc, a trademark) and the semiconductor memory 214 including a Memory Stick.

It should be noted that, in this specification, steps describing a program stored in the recording medium can of course be executed sequentially one step after another in accordance with a written procedure. However, the steps do not have to be executed sequentially but, instead, the steps may also include pieces of processing to be carried out in parallel or individually.

In addition, the technical term "system" used in this specification means the entire system including a plurality of apparatuses.

While a preferred embodiment of the present invention has been described using specific terms, such description is for illustrative purposes only, and it is to be understood that changes and variations may be made without departing from the spirit or scope of the following claims.

What is claimed is:

1. An information-processing apparatus connected to another information-processing apparatus via a network, said information-processing apparatus comprising:
    input means for inputting on and off commands;
    first timing recognition means for recognizing a first timing with which an on command is input by said input means;
    second timing recognition means for recognizing a second timing with which an off command is input by said input means; and
    transmission means for transmitting said first and second timings to said other information-processing apparatus via said network.

2. An information-processing apparatus according to claim 1 wherein said network has a Bluetooth configuration.

3. An information-processing apparatus according to claim 1 wherein said first timing recognition means recognizes a plurality of said first timings different from each other and said second timing recognition means recognizes a plurality of said different second timings corresponding to said respective different first timings.

4. An information-processing method adopted by an information-processing apparatus connected to another information-processing apparatus via a network, said information-processing method comprising:
    an input step for inputting on and off commands;
    a first timing recognition step for recognizing a first timing with which an on command is input in said input step;
    a second timing recognition step for recognizing a second timing with which an off command is input in said input step; and
    a transmission step for transmitting said first and second timings to said other information-processing apparatus via said network.

5. A recording medium readable by a computer and having recorded therein a computer readable program allowing the computer an information-processing apparatus connected to another information-processing apparatus via a network, said computer-readable program comprising:
    an input control step for controlling input of on and off commands;
    a first timing recognition control step for controlling recognition of recognizing a first timing with which an on command is input in said input control step;
    a second timing recognition control step or controlling recognition of recognizing a second timing with which an off command is input in said input control step; and
    a transmission control step for controlling transmission of said first and second timings to said another information-processing apparatus via said network.

6. An information-processing apparatus connected to another information-processing apparatus via a network, said information-processing apparatus comprising:
    input means for inputting on and off commands;
    first timing recognition means for recognizing a first timing with which an on command is input by said input means;

second timing recognition means for recognizing a second timing with which an off command is input by said input means;

reception means for receiving a third timing and a fourth timing from said other information-processing apparatus where said third timing is a timing by which an input means employed by said other information-processing apparatus inputs an on command and said fourth timing is a timing by which said input means employed by said other information-processing apparatus inputs an off command;

comparison means for comparing said first timing with said third timing and comparing said second timing with said fourth timing; and authentication means for executing authentication processing with respect to said other information-processing apparatus on the basis of a comparison result produced by said comparison means.

7. An information-processing apparatus according to claim 6 wherein said network has a Bluetooth configuration.

8. An information-processing apparatus according to claim 6 wherein said comparison means finds a first difference between said first timing and said third timing as well as a second difference between said second timing and said fourth timing, and determines whether or not said first and second differences are each within a predetermined range.

9. An information-processing apparatus according to claim 8 wherein, if said first and second differences are each within a predetermined range, said authentication means authenticates said other information-processing apparatus.

10. An information-processing apparatus according to claim 6 wherein said first timing recognition means recognizes a plurality of said first timings different from each other, said second timing recognition means recognizes a plurality of said second timings, which are different from each other and correspond to said respective different first timings, and said reception means receives a plurality of said third timings different from each other as well as a plurality of said fourth timings, which are different from each other and correspond to said respective different third timings, from said other information-processing apparatus.

11. An information-processing method adopted by an information-processing apparatus connected to another information-processing apparatus via a network, said information-processing method comprising:

an input step for inputting on and off commands;

a first timing recognition step for recognizing a first timing with which an on command is input in said input step;

a second timing recognition step for recognizing a second timing with which an off command is input in said input step;

a reception step for receiving a third timing and a fourth timing from said other information-processing apparatus where said third timing is a timing by which said other information-processing apparatus inputs an on command in an input step and said fourth timing is a timing by which said other information-processing apparatus inputs an off command in an input step;

a comparison step for comparing said first timing with said third timing and comparing said second timing with said fourth timing; and an authentication step for executing authentication processing with respect to said other information-processing apparatus on the basis of a comparison result produced in said comparison step.

12. A recording medium readable by a computer and having recorded thereon a computer-readable program to control an information-processing apparatus connected to another information-processing apparatus via a network, said computer-readable program comprising:

an input control step for controlling input of on and off commands;

a first timing recognition control step for controlling recognition of a first timing with which an on command is input in said input control step;

a second timing recognition control step for controlling recognition of a second timing with which an off command is input in said input control step;

a reception control step for controlling reception of a third timing and a fourth timing from said other information-processing apparatus where said third timing is a timing by which said other information-processing apparatus inputs an on command in an input control step and said fourth timing is a timing by which said other information-processing apparatus inputs an off command in an input control step;

a comparison control step or controlling comparison of said first timing with said third timing and comparing said second timing with said fourth timing; and an authentication control step for controlling execution of authentication processing with respect to said other information-processing apparatus on the basis of a comparison result produced in said comparison control step.

13. An information-processing system including a first information-processing apparatus and a second information-processing apparatus connected to said first information-processing apparatus via a network, said first information-processing apparatus comprising:

first input means for inputting on and off commands;

first timing recognition means for recognizing a first timing with which an on command is input by said first input means;

second timing recognition means for recognizing a second timing with which an off command is input by said first input means; and transmission means for transmitting said first and second timings to said second information-processing apparatus via said network, said second information-processing apparatus comprising:

second input means for inputting on and off commands;

third timing recognition means for recognizing a third timing with which an on command is input by said second input means;

fourth timing recognition means for recognizing a fourth timing with which an off command is input by said second input means;

reception means for receiving said first and second timings from said first information-processing apparatus via said network;

comparison means for comparing said first timing with said third timing and comparing said second timing with said fourth timing; and authentication means for executing authentication processing with respect to said first information-processing apparatus on the basis of a comparison result produced by said comparison means.

14. An information-processing system according to claim 13 wherein said network has a Bluetooth configuration.

15. An information-processing system according to claim 13 wherein said comparison means finds a first difference between said first timing and said third timing as well as a second difference between said second timing and said fourth timing, and determines whether or not said first and second differences are each within a predetermined range.

16. An information-processing apparatus according to claim 15 wherein, if said first and second differences are each within a predetermined range, said authentication means authenticates said first information-processing apparatus.

17. An information-processing apparatus according to claim 13 wherein said first timing recognition means recognizes a plurality of said first timings different from each other, said second timing recognition means recognizes a plurality of said second timings, which are different from each other and correspond to said respective different first timings, said third timing recognition means recognizes a plurality of said third timings different from each other, said fourth timing recognition means recognizes a plurality of said fourth timings, which are different from each other and correspond to said respective different third timings and said reception means receives said first timings as well as said second timings from said first information-processing apparatus via said network.

18. An information-processing method adopted by an information-processing system including a first information-processing apparatus and a second information-processing apparatus connected to said first information-processing apparatus via a network,
said information-processing method for said first information-processing apparatus comprising:
a first input step for inputting on and off commands;
a first timing recognition step for recognizing a first timing with which an on command is input in said first input step;
a second timing recognition step for recognizing a second timing with which an off command is input in said first input step; and
a transmission step for transmitting said first and second timings to said second information-processing apparatus via said network,
said information-processing method for said second information-processing apparatus comprising:
a second input step for inputting on and off commands;
a third timing recognition step for recognizing a third timing with which an on command is input in said second input step;
a fourth timing recognition step for recognizing a fourth timing with which an off command is input in said second input step;
a reception step for receiving said first and second timings from said first information-processing apparatus via said network;
a comparison step for comparing said first timing with said third timing and comparing said second timing with said fourth timing; and
an authentication step for executing authentication processing with respect to said first information-processing apparatus on the basis of a comparison result produced in said comparison step.

19. A recording medium readable by a computer and having recorded therein a computer-readable program allowing the computer to control an information-processing system including a first information-processing apparatus and a second information-processing apparatus connected to said first information-processing apparatus via a network,
said computer-readable program for said first information-processing apparatus comprising:
a first input control step for controlling input of on and off commands;
a first timing recognition control step for controlling recognition of a first timing with which an on command is input in said first input control step;
a second timing recognition control step for controlling recognition of a second timing with which an off command is input in said first input control step; and
a transmission control step for controlling transmission of said first and second timings to said second information-processing apparatus via said network, said computer-readable program for said second information-processing apparatus comprising:
a second input control step for controlling input of on and off commands;
a third timing recognition control step for controlling recognition of a third timing with which an on command is input in said second input control step;
a fourth timing recognition control step for controlling recognition of a fourth timing with which an off command is input in said second input control step;
a reception control step for controlling reception of said first and second timings from said first information-processing apparatus via said network;
a comparison control step for controlling comparison of said first timing with said third timing and comparing said second timing with said fourth timing; and
an authentication control step for controlling execution of authentication processing with respect to said first information-processing apparatus on the basis of a comparison result produced in said comparison control step.

20. An information-processing apparatus connected to another information-processing apparatus via a network, said information-processing apparatus comprising:
input means for inputting on and off commands;
first timing recognition means for recognizing a first timing with which an on command is input by said input means;
second timing recognition means for recognizing a second timing with which an off command is input by said input means;
transmission means for transmitting said first or second timing to said other information-processing apparatus via said network;
reception means for receiving a third timing corresponding to said first timing or a fourth timing corresponding to said second timing from said other information-processing apparatus where said third timing is a timing by which an input means employed by said other information-processing apparatus inputs an on command and said fourth timing is a timing by which said input means employed by said other information-processing apparatus inputs an off command;
comparison means for comparing said first timing with said third timing or comparing said second timing with said fourth timing; and
authentication means for executing authentication processing with respect to said other information-processing apparatus on the basis of a comparison result produced by said comparison means.

21. An information-processing apparatus according to claim 20 wherein said network has a Bluetooth configuration.

22. An information-processing apparatus according to claim 20 wherein said first timing recognition means recognizes a plurality of said first timings different from each other, said second timing recognition means recognizes a plurality of said second timings, which are different from each other and correspond to said respective different first timings, and said reception means receives a plurality of said third timings different from each other or a plurality of said fourth timings, which are different from each other and correspond to said respective different third timings, from said other information-processing apparatus.

23. An information-processing apparatus according to claim 20 wherein said comparison means finds a first difference between said first timing and said third timing or a second difference between said second timing and said fourth timing, and determines whether or not said first and second differences are each within a predetermined range.

24. An information-processing apparatus according to claim 23 wherein, if said first or second difference is within a predetermined range, said authentication means authenticates said other information-processing apparatus.

25. An information-processing method adopted by an information-processing apparatus connected to another information-processing apparatus via a network, said information-processing method comprising:
   an input step for inputting on and off commands;
   a first timing recognition step for recognizing a first timing with which an on command is input in said input step;
   a second timing recognition step for recognizing a second timing with which an off command is input in said input step;
   a transmission step for transmitting said first or second timing to said other information-processing apparatus via said network;
   a reception step for receiving a third timing corresponding to said first timing or a fourth timing corresponding to said second timing from said other information-processing apparatus where said third timing is a timing by which said other information-processing apparatus inputs an on command in an input step and said fourth timing is a timing by which said other information-processing apparatus inputs an off command in an input step;
   a comparison step for comparing said first timing with said third timing or comparing said second timing with said fourth timing; and
   an authentication step for executing authentication processing with respect to said other information-processing apparatus on the basis of a comparison result produced in said comparison step.

26. A recording medium readable by a computer and having recorded therein a computer readable program allowing the computer to control an information-processing apparatus connected to another information-processing apparatus via a network, said computer-readable program comprising:
   an input control step for controlling input of on and off commands;
   a first timing recognition control step for controlling recognition of a first timing with which an on command is input in said input control step;
   a second timing recognition control step for controlling recognition of a second timing with which an off command is input in said input control step;
   a transmission control step for controlling transmission of said first or second timing to said other information-processing apparatus via said network;
   a reception control step for controlling reception of a third timing corresponding to said first timing or a fourth timing corresponding to said second timing from said other information-processing apparatus where said third timing is a timing by which said other information-processing apparatus inputs an on command in an input control step and said fourth timing is a timing by which said other information-processing apparatus inputs an off command in an input control step;
   a comparison control step for controlling comparison of said first timing with said third timing or comparing said second timing with said fourth timing; and
   an authentication control step for controlling execution of authentication processing with respect to said other information-processing apparatus on the basis of a comparison result produced in said comparison control step.

27. An information-processing system including a first information-processing apparatus and a second information-processing apparatus connected to said first information-processing apparatus via a network,
   said first information-processing apparatus comprising:
   first input means for inputting on and off commands;
   first timing recognition means for recognizing a first timing with which an on command is input by said first input means; second timing recognition means for recognizing a second timing with which an off command is input by said first input means; and
   first transmission means for transmitting said second timing to said second information-processing apparatus via said network,
   said second information-processing apparatus comprising:
   second input means for inputting on and off commands;
   third timing recognition means for recognizing a third timing with which an on command is input by said second input means;
   fourth timing recognition means for recognizing a fourth timing with which an off command is input by said second input means; and
   second transmission means for transmitting said third timing to said first information-processing apparatus via said network,
   wherein said first information-processing apparatus comprises:
   first reception means for receiving said third timing from said second information-processing apparatus via said network;
   first comparison means for comparing said first timing with said third timing and first authentication means for executing authentication processing with respect to said second information-processing apparatus on the basis of a comparison result produced by said first comparison means, and
   wherein said second information-processing apparatus comprises:
   second reception means for receiving said second timing from said first information-processing apparatus via said network;
   second comparison means for comparing said second timing with said fourth timing; and
   second authentication means for executing authentication processing with respect to said first information-processing apparatus on the basis of a comparison result produced by said second comparison means.

28. An information-processing system according to claim 27 wherein said network has a Bluetooth configuration.

29. An information-processing System according to claim 27 wherein said first comparison means finds a first difference between said first timing and said third timing whereas said second comparison means finds a second difference between said second timing and said fourth timing, and said first comparison means and said second comparison means determine whether or not said first and second differences respectively are each within a predetermined range.

30. An information-processing system according to claim 29 wherein, if said first and second differences are each within a predetermined range, said first authentication means and said second authentication means authenticate said second and first information-processing apparatus respectively.

31. An information-processing system according to claim 27 wherein said first timing recognition means recognizes a plurality of said first timings different from each other, said second timing recognition means recognizes a plurality of said second timings, which are different from each other and correspond to said respective different first timings, said third timing recognition means recognizes a plurality of said third timings different from each other, said fourth timing recognition means recognizes a plurality of said fourth timings, which are different from each other and correspond to said respective different third timings, said first reception means receives said third timings from said second information-processing apparatus via said network from said other information-processing apparatus and said second reception means receives said second timings from said first information-processing apparatus via said network.

32. An information-processing method adopted by an information-processing system including a first information-processing apparatus and a second information-processing apparatus connected to said first information-processing apparatus via a network, said information-processing method for said first information-processing apparatus comprising:

a first input step for inputting on and off commands;

a first timing recognition step for recognizing a first timing with which an on command is input in said first input step;

a second timing recognition step for recognizing a second timing with which an off command is input in said first input step; and a first transmission step for transmitting said second timing to said second information-processing apparatus via said network, said information-processing method for said second information-processing apparatus comprising:

a second input step for inputting on and off commands;

a third timing recognition step for recognizing a third timing with which an on command is input in said second input step;

a fourth timing recognition step for recognizing a fourth timing with which an off command is input in said second input step; and a second transmission step for transmitting said second timing from said first information-processing apparatus via said network;

wherein said information-processing method for said first information-processing apparatus comprises:

a first reception step for receiving said third timing from said second information-processing apparatus via said network;

a first comparison step for comparing said first timing with said third timing; and a first authentication step for executing authentication processing with respect to said second information-processing apparatus on the basis of a comparison result produced in said first comparison control step, and wherein said information-processing method for said second information-processing apparatus comprises:

a second reception step for receiving said second timing from said first information-processing apparatus via said network;

a second comparison step for comparing said second timing with said fourth timing; and a second authentication step for executing authentication processing with respect to said first information-processing apparatus on the basis of a comparison result produced in said second comparison step.

33. A recording medium readable by a computer and having recorded therein a computer readable program allowing the computer to control an information processing system to execute control processing, said information processing system including a first information processing apparatus and a second information apparatus connected to said first information processing apparatus via a network, said first information processing apparatus comprising:

first input means for inputting on and off commands;

first timing recognition means for recognizing a first timing with which an on command is input by said first input means;

second timing recognition means for recognizing a second timing with which an off command is input by said first input means; and first transmission means for transmitting said second timing to said second information processing apparatus via said network, said second information processing apparatus comprising:

second input means for inputting on and off commands;

third timing recognition means for recognizing a third timing with which art on command is input by said second input means;

fourth timing recognition means for recognizing a fourth timing with which an off command is input by said second input means; and second transmission means for transmitting said third timing to said first information processing apparatus via said network, wherein said program causes one of said computers for controlling said first information processing apparatus to execute:

a first reception control step for controlling reception of said third timing from said second information processing apparatus;

a first comparison control step for controlling comparison of said first timing with said third timing; and a first authentication control step for controlling execution of authentication processing with respect to said second information processing apparatus on the basis of a comparison result produced in said first comparison control step, and wherein said program causes the other of said computers for controlling said second information processing apparatus to execute:

a second reception control step for controlling reception of said second timing from said first information processing apparatus;

a second comparison control step for controlling comparison of said second timing with said fourth timing; and a second authentication control step for controlling execution of authentication processing with respect to said first information processing apparatus on the basis of a comparison result produced in said second comparison control step.

34. An information-processing apparatus connected to another information-processing apparatus via a network, said information-processing apparatus comprising:
input means for inputting on and off commands;
first timing recognition means for recognizing a first timing with which an on command or off command is input by said input means;
reception means for receiving a second timing from said other information-processing apparatus where said second timing is a timing by which an input means employed by said other information-processing apparatus inputs an on command or off command;
comparison means for comparing said first timing with said second timing; and
authentication means for executing authentication processing with respect to said other information-processing apparatus on the basis of a comparison result produced by said comparison means.

35. An information-processing method adopted by an information-processing apparatus connected to another information-processing apparatus via a network, said information-processing method comprising:
an input step for inputting on and off commands;
a first timing recognition step for recognizing a first timing with which an on command or off command is input in said input step;
a reception step for receiving a second timing from said other information-processing apparatus where said second timing is a timing by which said other information-processing apparatus inputs an on command or off command;
a comparison step for comparing said first timing with said second timing; and
an authentication step for executing authentication processing with respect to said other information-processing apparatus on the basis of a comparison result produced in said comparison step.

36. A recording medium readable by a computer and having recorded thereon a computer-readable program to control an information-processing apparatus connected to another information-processing apparatus via a network, said computer-readable program comprising:
an input control step for controlling input of on and off commands;
a first timing recognition control step for controlling recognition of a first timing with which an on command or off command is input in said input control step;
a reception control step for controlling reception of a second timing from said other information-processing apparatus where said second timing is a timing by which said other information-processing apparatus inputs an on command or off command in an input control step;
a comparison control step or controlling comparison of said first timing with said second timing; and
an authentication control step for controlling execution of authentication processing with respect to said other information-processing apparatus on the basis of a comparison result produced in said comparison control step.

37. An information-processing system including a first information-processing apparatus and a second information-processing apparatus connected to said first information-processing apparatus via a network,
said first information-processing apparatus comprising:
first input means for inputting on and off commands;
first timing recognition means for recognizing a first timing with which an on command or off command is input by said first input means; and
transmission means for transmitting said first timing to said second information-processing apparatus via said network,
said second information-processing apparatus comprising:
second input means for inputting on and off commands;
second timing recognition means for recognizing a second timing with which an on command or off command is input by said second input means;
reception moans for receiving said first timing from said first information-processing apparatus via said network;
comparison means for comparing said first timing with said second timing; and
authentication means for executing authentication processing with respect to said first information-processing apparatus on the basis of a comparison result produced by said comparison means.

38. An information-processing method adopted by an information-processing system including a first information-processing apparatus and a second information-processing apparatus connected to said first information-processing apparatus via a network, said information-processing method for said first information-processing apparatus comprising:
a first input step for inputting on and off commands;
a first timing recognition step for recognizing a first timing with which an on command or off command is input in said first input step; and
a transmission step for transmitting said first timing to said second information-processing apparatus via said network;
said information-processing method for said second information-processing apparatus comprising:
a second input step for inputting on and off commands;
a second timing recognition step for recognizing a second timing with which an on command or off command is input in said second input step;
a reception step for receiving said first timing from said first information-processing apparatus via said network;
a comparison step for comparing said first timing with said second timing; and
an authentication step for executing authentication processing with respect to said first information-processing apparatus on the basis of a comparison result produced in said comparison step.

39. A recording medium readable by a computer and having recorded therein a computer-readable program allowing the computer to control an information-processing system including a first information-processing apparatus and a second information-processing apparatus connected to said first information-processing apparatus via a network,
said computer-readable program for said first information-processing apparatus comprising:
a first input control step for controlling input of on and off commands;

a first timing recognition control step for controlling recognition of a first timing with which an on command or off command is input in said first input control step; and a transmission control step for controlling transmission of said first timing to said second information-processing apparatus via said network, said computer-readable program for said second information-processing apparatus comprising:

a second input control step for controlling input of on and off commands;

a second timing recognition control step for controlling recognition of a second timing with which an on command or off command is input in said second input control step;

a reception control step for controlling reception of said first timing from said first information-processing apparatus via said network;

a comparison control step for controlling comparison of said first timing with said second timing; and an authentication control step for controlling execution of authentication processing with respect to said first information-processing apparatus on the basis of a comparison result produced in said comparison control step.

40. An information-processing apparatus connected to another information-processing apparatus via a network, said information-processing apparatus comprising:

input means for inputting on and off commands;

first timing recognition means for recognizing a first timing with which an on command or off command is input by said input means;

transmission means for transmitting said first timing to said other information-processing apparatus via said network;

reception means for receiving a second timing corresponding to said first timing from said other information-processing apparatus where said second timing is a timing by which an input means employed by said other information-processing apparatus inputs an on command or off command;

comparison means for comparing said first timing with said second timing; and authentication means for executing authentication processing with respect to said other information-processing apparatus on the basis of a comparison result produced by said comparison means.

41. An information-processing method adopted by an information-processing apparatus connected to another information-processing apparatus via a network, said information-processing method comprising:

an input step for inputting on and off commands;

a first timing recognition step for recognizing a first timing with which an on command or off command is input in said input step;

a transmission step for transmitting said first timing to said other information-processing apparatus via said network;

a reception step for receiving a second timing corresponding to said first timing from said other information-processing apparatus where said second timing is a timing by which said other information-processing apparatus inputs an on command or off command in an input step;

a comparison step for comparing said first timing with said second timing; and an authentication step for executing authentication processing with respect to said other information-processing apparatus on the basis of a comparison result produced in said comparison step.

42. A recording medium readable by a computer and having recorded therein a computer readable program allowing the computer to control an information-processing apparatus connected to another information-processing apparatus via a network, said computer-readable program comprising:

an input control step for controlling input of on and off commands;

a first timing recognition control step for controlling recognition of a first timing with which an on command or off command is input in said input control step;

a transmission control step for controlling transmission of said first timing to said other information-processing apparatus via said network;

a reception control step for controlling reception of a second timing corresponding to said first timing from said other information-processing apparatus where said second timing is a timing by which said other information-processing apparatus inputs an on command or off command in an input control step;

a comparison control step for controlling comparison of said first timing with said second timing; and an authentication control step for controlling execution of authentication processing with respect to said other information-processing apparatus on the basis of a comparison result produced in said comparison control step.

43. An information-processing system including a first information-processing apparatus and a second information-processing apparatus connected to said first information-processing apparatus via a network, said first information-processing apparatus comprising:

first input means for inputting on and off commands;

first timing recognition means for recognizing a first timing with which an on command or off command is input by said first input means;

first transmission means for transmitting said first timing to said second information-processing apparatus via said network, said second information-processing apparatus comprising:

second input means for inputting on and off commands;

second timing recognition means for recognizing a second timing with which an on command or off command is input by said second input means; and second transmission means for transmitting said second timing to said first information-processing apparatus via said network, wherein said first information-processing apparatus further comprises:

first reception means for receiving said second timing from said second information-processing apparatus via said network;

first comparison means for comparing said first timing with said second timing; and first authentication means for executing authentication processing with respect to said second information-processing apparatus on the basis of a comparison result produced by said first comparison means, and wherein said second information-processing apparatus further comprises:

second reception means for receiving said first timing from said first information-processing apparatus via said network;

second comparison means for comparing said first timing with said second timing; and second authentication means for executing authentication processing with respect to said first information-processing apparatus on the basis of a comparison result produced by said second comparison means.

44. An information-processing method adopted by en information-processing system including a first information-processing apparatus and a second information-processing apparatus connected to said first information-processing apparatus via a network, said information-processing method for said first information-processing apparatus comprising:

a first input step for inputting on and off commands;

a first timing recognition step for recognizing a first timing with which an on command or off command is input in said first input step; and a first transmission step for transmitting said first timing to said second information-processing apparatus via said network, said information-processing method for said second information-processing apparatus comprising:

a second input step for inputting on and off commands;

a second timing recognition step for recognizing a second timing with which an on commend or off command is input in said second input step; and a second transmission step for transmitting said second timing to said first information-processing apparatus via said network;

wherein said information-processing method for said first information-processing apparatus further comprises:

a first reception step for receiving said second timing from said second information-processing apparatus via said network;

a first comparison step for comparing said first timing with said second timing; and a first authentication step for executing authentication processing with respect to said second information-processing apparatus on the basis of a comparison result produced in said first comparison control step, and wherein said information-processing method for said second information-processing apparatus further comprises:

a second reception step for receiving said first timing from said first information-processing apparatus via said network;

a second comparison step for comparing said first timing with said second timing; and a second authentication step for executing authentication processing with respect to said first information-processing apparatus on the basis of a comparison result produced in said second comparison step.

45. A recording medium readable by a computer and having recorded therein a computer readable program allowing the computer to control an information processing system to execute control processing, said information processing system including a first information processing apparatus and a second information apparatus connected to said first information processing apparatus via a network, said first information processing apparatus comprising:

first input means for inputting on and off commands;

first timing recognition means for recognizing a first timing with which an on command or off command is input by said first input means; and first transmission means for transmitting said second timing to said first information processing apparatus via said network, said second information processing apparatus comprising:

second input means for inputting on and off commands;

second timing recognition means for recognizing a second timing with which an on command or off command is input by said second input means; and second transmission means for transmitting said second timing to said first information processing apparatus via said network, wherein said program causes a computer for controlling said first information processing apparatus to execute:

a first reception control step for controlling reception of said second timing from said second information processing apparatus;

a first comparison control step for controlling comparison of said first timing with said second timing; and a first authentication control step for controlling execution of authentication processing with respect to said second information processing apparatus on the basis of a comparison result produced in said first comparison control step, and wherein said program causes a computer for controlling said second information processing apparatus to execute:

a second reception control step for controlling reception of said first timing from said first information processing apparatus;

a second comparison control step for controlling comparison of said first timing with said second timing; and a second authentication control step for controlling execution of authentication processing with respect to said first information processing apparatus on the basis of a comparison result produced in said second comparison control step.

* * * * *